United States Patent
Abarzadeh et al.

(10) Patent No.: US 12,074,536 B2
(45) Date of Patent: Aug. 27, 2024

(54) CONSTANT-FREQUENCY SINGLE-CARRIER SENSOR-LESS MODULATION FOR THE THREE LEVEL FLYING CAPACITOR MULTICELL CONVERTER

(71) Applicant: SMARTD TECHNOLOGIES INC., Montréal (CA)

(72) Inventors: Mostafa Abarzadeh, Côte Saint-Luc (CA); Simon Caron, Outremont (CA)

( * ) Notice: Subject to any disclaimer, the term of this patent is extended or adjusted under 35 U.S.C. 154(b) by 0 days.

(21) Appl. No.: 18/439,173

(22) Filed: Feb. 12, 2024

(65) Prior Publication Data

US 2024/0186915 A1  Jun. 6, 2024

Related U.S. Application Data

(63) Continuation of application No. PCT/CA2023/051055, filed on Aug. 8, 2023.

(60) Provisional application No. 63/371,131, filed on Aug. 11, 2022.

(51) Int. Cl.
*H02M 7/483* (2007.01)
*H02M 1/088* (2006.01)
*H02M 1/44* (2007.01)

(52) U.S. Cl.
CPC ......... *H02M 7/4837* (2021.05); *H02M 1/088* (2013.01); *H02M 1/44* (2013.01); *H02M 7/4835* (2021.05)

(58) Field of Classification Search
CPC ...... H02M 7/4837; H02M 1/088; H02M 1/44; H02M 7/4835; H02M 7/539
See application file for complete search history.

(56) References Cited

U.S. PATENT DOCUMENTS

| | | | | |
|---|---|---|---|---|
| 4,323,731 A * | 4/1982 | Hershberger | .......... | H04H 20/49 455/114.1 |
| 4,367,520 A * | 1/1983 | Muto | .................... | H02M 7/527 318/811 |
| 5,610,806 A * | 3/1997 | Blasko | ................ | H02M 7/5395 363/41 |
| 6,798,375 B2* | 9/2004 | Brosche | .................... | G01S 7/36 342/159 |

(Continued)

OTHER PUBLICATIONS

International application No. PCT/CA2023/051055 International Search Report dated Nov. 22, 2023.

(Continued)

*Primary Examiner* — Yusef A Ahmed
(74) *Attorney, Agent, or Firm* — Anglehart et al.

(57) ABSTRACT

A three-level flying capacitor multi-level (3L-FCM) power converter is controlled by a switching signal generator having a reference signal for generating switching signals for driving a first pair S1, S1' and a second pair S2, S2' of switches. Circuitry generates, from the reference signal, a first modified reference signal defined as half of the sum of 1 and the reference signal. From the first modified reference signal a second modified reference signal is generated having a half-period phase shift from the first modified reference signal. A carrier signal having a constant frequency is generated and a first comparator and a second comparator compare the first and the second modified reference signals to the carrier signal to generate frequency signals for driving the first pair of switches S1, S1', and the second pair of switches S2, S2', respectively.

19 Claims, 17 Drawing Sheets

(56) References Cited

U.S. PATENT DOCUMENTS

| | | | | |
|---|---|---|---|---|
| 9,735,677 | B2* | 8/2017 | Ihs | H02M 3/157 |
| 2005/0285582 | A1* | 12/2005 | Azuma | H02M 7/53873 |
| | | | | 323/282 |
| 2010/0134053 | A1* | 6/2010 | Yamada | H02P 27/08 |
| | | | | 318/162 |
| 2012/0075900 | A1* | 3/2012 | Nakagawa | H02M 7/53875 |
| | | | | 363/132 |
| 2013/0016549 | A1* | 1/2013 | Kieferndorf | H02M 7/487 |
| | | | | 363/131 |
| 2014/0241016 | A1* | 8/2014 | Ho | H02M 7/493 |
| | | | | 363/40 |
| 2015/0008750 | A1* | 1/2015 | Shen | H02M 7/487 |
| | | | | 307/82 |
| 2015/0009734 | A1* | 1/2015 | Stahl | H02M 7/53871 |
| | | | | 363/98 |
| 2016/0218703 | A1* | 7/2016 | Nielsen | H03K 7/08 |
| 2016/0380551 | A1* | 12/2016 | Hoerger | H02M 7/44 |
| | | | | 363/65 |
| 2018/0062537 | A1* | 3/2018 | Wang | H02M 1/08 |
| 2018/0097486 | A1* | 4/2018 | Salem | H03F 3/72 |
| 2020/0304053 | A1* | 9/2020 | Ue | H02M 7/53871 |
| 2020/0350847 | A1* | 11/2020 | Geyer | H02P 27/12 |
| 2020/0389095 | A1* | 12/2020 | Kajiyama | H02M 3/33584 |
| 2021/0067057 | A1* | 3/2021 | Abarzadeh | H02M 7/4837 |
| 2021/0336541 | A1* | 10/2021 | Xie | H02M 3/07 |
| 2022/0278658 | A1* | 9/2022 | Lesso | H03F 1/3258 |
| 2023/0001979 | A1* | 1/2023 | Mori | H02M 1/44 |
| 2023/0223886 | A1* | 7/2023 | Abarzadeh | H02P 27/14 |
| | | | | 318/504 |
| 2023/0369964 | A1* | 11/2023 | Abarzadeh | H02M 1/0054 |
| 2023/0412090 | A1* | 12/2023 | Abdelhamid | H02M 7/4837 |

OTHER PUBLICATIONS

International application No. PCT/CA2023/051055 Written Opinion of the International Searching Authority dated Nov. 22, 2023.
Rodriguez, J. et al., "Multilevel inverters: a survey of topologies, controls, and applications". IEEE Transactions on Industrial Electronics, Aug. 2022, vol. 49, Issue 4, pp. 724-738.
Balamurugan, C. et al., "A Review on Modulation Strategies of Multi Level Inverter". The Indoesian Journal of Electrical Engineering and Computer Science, Sep. 2016, vol. 3, No. 3, pp. 681-705.
Manias, S., "Power Electronics and Motor Drive Systems". (book), Jan. 6, 2017, Chapter 6.5.5.3, pp. 270-500, ISBN 978-0-12-811798-9.
Abarzadeh, M. et al., "Reliability and Performance Improvement of PUC Converter Using a New Single-Carrier Sensor-Less PWM Method With Pseudo Reference Fuctions". IEEE Transaction on Power Electronics, Oct. 13, 2020, vol. 36, Issue 5, pp. 6092-6105.
Wilkinson et al., "Natural Balance of Multicell Converters: The Two-Cell Case". IEEE Transactions on Power Electronics (vol. 21, Issue: 6, Nov. 2006). pp. 1649-1657.
Abarzadeh et al., "Reliability and Performance Improvement of PUC Converter Using a New Single-Carrier Sensor-Less PWM Method With Pseudo Reference Functions". IEEE Transactions on Power Electronics (vol. 36, Issue: 5, May 2021). pp. 6092-6105.
H. Akagi, "Multilevel Converters: Fundamental Circuits and Systems," Proceedings of the IEEE, vol. 105, No. 11, pp. 2048-2065, 2017, doi: 10.1109/JPROC.2017.2682105.
J. Rodriguez et al., "Multilevel Converters: An Enabling Technology for High-Power Applications," Proceedings of the IEEE, vol. 97, No. 11, pp. 1786-1817, 2009, doi: 10.1109/JPROC.2009.2030235.
M. Abarzadeh, et al., "A New Configuration of Paralleled Modular ANPC Multilevel Converter Controlled by an Improved Modulation Method for 1MHz, 1MW EV Charger," IEEE Transactions on Industry Applications, pp. 1-1, 2020, doi: 10.1109/TIA.2020.3019778.

M. Abarzadeh, et al., "A Generalized Scalable Configuration of Hybrid "Si+SiC" Paralleled Modular ANPC Converter," in 2021 IEEE Applied Power Electronics Conference and Exposition (APEC), Jun. 14-17, 2021 2021, pp. 2791-2797, doi: 10.1109/APEC42165.2021.9487106. (Abstract).
M. T. Fard, et al., "Si/SiC hybrid 5-level active NPC inverter for electric aircraft propulsion drive applications," Chinese Journal of Electrical Engineering, vol. 6, No. 4, pp. 63-76, 2020, doi: 10.23919/CJEE.2020.000031.
D. Han, et al., "Comparison Between Output CM Chokes for SiC Drive Operating at 20- and 200-kHz Switching Frequencies," IEEE Transactions on Industry Applications, vol. 53, No. 3, pp. 2178-2188, 2017, doi: 10.1109/TIA.2017.2672919.
A. K. Morya et al., "Wide Bandgap Devices in AC Electric Drives: Opportunities and Challenges," IEEE Transactions on Transportation Electrification, vol. 5, No. 1, pp. 3-20, 2019, doi: 10.1109/TTE.2019.2892807.
J. Reimers, et al., "Automotive Traction Inverters: Current Status and Future Trends," IEEE Transactions on Vehicular Technology, vol. 68, No. 4, pp. 3337-3350, 2019, doi: 10.1109/TVT.2019.2897899.
A. M. Y. M. et al., "Single-Carrier Phase-Disposition PWM Implementation for Multilevel Flying Capacitor Converters," IEEE Transactions on Power Electronics, vol. 30, No. 10, pp. 5376-5380, 2015, doi: 10.1109/TPEL.2015.2427201.
M. Abarzadeh, et al., "Novel Simplified Single Carrier PWM Method for 5L ANPC Converter with Capacitor Voltage Self-Balancing and Improved Output Voltage Spectrum," in 2019 IEEE 28th International Symposium on Industrial Electronics (ISIE), Jun. 12-14, 2019 2019, pp. 2021-2026, doi: 10.1109/ISIE.2019.8781502.
R. H. Wilkinson, et al., "Natural Balance of Multicell Converters: The Two-Cell Case," IEEE Transactions on Power Electronics, vol. 21, No. 6, pp. 1649-1657, 2006, doi: 10.1109/TPEL.2006.882958.
R. H. Wilkinson, T et al., "Natural Balance of Multicell Converters: The General Case," IEEE Transactions on Power Electronics, vol. 21, No. 6, pp. 1658-1666, 2006, doi: 10.1109/TPEL.2006.882951.
M. Khazraei, et al., "Active Capacitor Voltage Balancing in Single-Phase Flying-Capacitor Multilevel Power Converters," IEEE Transactions on Industrial Electronics, vol. 59, No. 2, pp. 769-778, 2012, doi: 10.1109/TIE.2011.2157290.
M. Khazraei, et al., "A generalized capacitor voltage balancing scheme for flying capacitor multilevel converters," in 2010 Twenty-Fifth Annual IEEE Applied Power Electronics Conference and Exposition (APEC), Feb. 21-25, 2010 2010, pp. 58-62, doi: 10.1109/APEC.2010.5433693.
A. Shukla, et al., "Natural Balancing of Flying Capacitor Voltages in Multicell Inverter Under PD Carrier-Based PWM," IEEE Transactions on Power Electronics, vol. 26, No. 6, pp. 1682-1693, 2011, doi: 10.1109/TPEL.2010.2089807.
B. P. McGrath et al., "Enhanced Voltage Balancing of a Flying Capacitor Multilevel Converter Using Phase Disposition (PD) Modulation," IEEE Transactions on Power Electronics, vol. 26, No. 7, pp. 1933-1942, 2011, doi: 10.1109/TPEL.2010.2097279.
J. Amini, "An Effortless Space-Vector-Based Modulation for N-level Flying Capacitor Multilevel Inverter With Capacitor Voltage Balancing Capability," IEEE Transactions on Power Electronics, vol. 29, No. 11, pp. 6188-6195, 2014, doi: 10.1109/TPEL.2014.2299716.
J. Ebrahimi, et al., "A Fast-Decoupled Space Vector Modulation Scheme for Flying Capacitor-Based Multilevel Converters," IEEE Transactions on Power Electronics, vol. 36, No. 12, pp. 14539-14549, 2021, doi: 10.1109/TPEL.2021.3089477.
A. K. Sadigh, et al., "New Active Capacitor Voltage Balancing Method for Flying Capacitor Multicell Converter Based on Logic-Form-Equations," IEEE Transactions on Industrial Electronics, vol. 64, No. 5, pp. 3467-3478, 2017, doi: 10.1109/TIE.2016.2614267.
V. Dargahi, et al., "Logic-Equations Method for Active Voltage-Control of a Flying-Capacitor Multilevel Converter Topology," in IECON 2018—44th Annual Conference of the IEEE Industrial Electronics Society, Oct. 21-23, 2018 2018, pp. 1291-1298, doi: 10.1109/IECON.2018.8591738.
A. K. Sadigh, et al., "New logic-form-equation based active voltage control for four-level flying capacitor multicell (FCM) converter,"

(56) References Cited

OTHER PUBLICATIONS in 2016 IEEE Energy Conversion Congress and Exposition (ECCE), Sep. 18-22, 2016 2016, pp. 1-6, doi: 10.1109/ECCE.2016.7855288.

* cited by examiner

CONSTANT-FREQUENCY SINGLE-CARRIER SENSOR-LESS MODULATION FOR THE THREE LEVEL FLYING CAPACITOR MULTICELL CONVERTER

TECHNICAL FIELD

This patent application relates to multi-level power converters.

BACKGROUND

Utilizing high-efficiency, high-power density, and more reliable power electronic converters in various industrial applications such as variable frequency drives (VFDs) require utilizing advanced configurations of power electronic converters and new generations of high-efficiency power devices. A wide variety of techniques are used to further improve the efficiency and reduce losses of these converters but doing so makes the device more complex and often creates alternative problems, challenges or losses further down the line. One of these techniques normally used to reduce switching loss consists of replacing the standard silicon-based insulated gate bipolar transistors (IGBTs) and silicon-based metal oxide semiconductor field-effect transistors (MOSFETs) with silicon carbide (SiC) and/or gallium nitride (GaN) switches. However, replacing standard switches with these faster SiC and GaN switches cause significantly higher electromagnetic interference (EMI) which further requires the EMI filter to be enlarged and redesigned. In order to efficiently implement these fast switches additional, more advanced and enhanced modulation techniques are required for EMI suppression purposes.

In general, a conventional two-carrier PS-PWM method is used to generate switching signals that can generate signals for driving the various pair of switches of the 3L-FCM. Such a conventional method generally consists of comparing a single reference signal with two carrier signals, phase-shifted by half a phase (180 degrees) from one another, that can be generated with a carrier signal generator for each of these carrier signals. However, this conventional method can suffer from drift or time lag between these two phase-shifted carrier signals, meaning that the phase shift is no longer exactly 180 degrees which leads to a drift between the various switching signals resulting from comparing the reference signal and the carrier signals. This may lead to an increase of the ripples across and unbalanced voltage of the flying capacitor of the 3L-FCM connected to the switches driven by the switching signal having the drift, which may require the use of a bigger flying capacitor or lead to significantly unstable output voltage (e.g. high-voltage ripple). Employing high switching frequency in the WBG based 3L-FCM converter exacerbates the impact of drift or time lag between two phase-shifted carrier signals on the voltage ripple across and voltage balancing of FC.

It is known in certain types of power converters to use advanced pulse-width modulation (PWM) techniques comprising two (phase shifted by π rad) constant-frequency carrier PWM as described and studied by H. Wilkinson et al. (doi: 10.1109/TPEL.2006.882958), where each carrier is dedicated to provide the corresponding switching signals to each cell (e.g., pairs of switches). It is also known in certain types of power converters to use advanced pulse-width modulation (PWM) techniques such as single-carrier PWM. Some modulation methods use a single carrier signal compared to two modified reference signals ($V_{ref}$) to generate the control signals for the converter's switches, such as a single-carrier sensor-less pulse width modulation methods as proposed by Abarzadeh et. al. (doi: 10.1109/TPEL.2020.3030698), for example.

Although solutions for this issue were proposed for five-level active neutral point clamped (5L-ANPC) converters as proposed by Abarzadeh et. al. in a paper presenting a *Novel Simplified Single Carrier PWM Method for 5L-ANPC Converter with Capacitor Voltage Self-Balancing Output and Improved Voltage Spectrum* (doi: 10.1109/ISIE.2019.8781502) and illustrated in FIG. 1A presenting FIGS. 1, 2 and 3 of that paper, to Applicant's knowledge, constant-frequency single-carrier (i.e., only one carrier signal with a constant frequency) sensor-less modulation for three-level flying capacitor multicell (3L-FCM) converters have not been applied. As someone skilled in the art can appreciate, the 5L-ANPC and the 3L-FCM converters are significantly different from aspects of the amount of output voltage levels and the hardware configuration. Therefore, the "single-carrier sensor-less modulation for the 5L-ANPC" is significantly different from the single carrier sensor-less modulation for the 3L-FCM proposed herein from the aspect of providing the corresponding switching signals to the power devices.

Although the resulting benefit of the elimination of the first and odd multiples of the switching harmonic clusters based on common relevant applied theories of sensor-less voltage balancing of the flying capacitor (FC) are similar, the proposed method provides four switching signals for the 3L-FCM instead of the eight switching signals required for the 5L-ANPC. The conventional configuration of the 5L-ANPC comprises a DC-DC flying capacitor cell with an active neutral point clamped having low-frequency legs whereas the 3L-FCM comprises a DC-AC flying capacitor cell implying that the configuration, relevant control and modulation schemes are completely different.

SUMMARY

An apparatus for generating switching signals of the high-frequency switches of a three-level flying capacitor multi-level converter without any drift between these signals has been developed.

The present proposes a three-level flying capacitor multi-level (3L-FCM) power converter controlled by a switching signal generator having a reference signal for generating switching signals for driving a first pair S1, S1' and a second pair S2, S2' of switches comprising: circuitry for generating, from the reference signal, a first modified reference signal defined as half of the sum of 1 and the reference signal; circuitry for generating from the first modified reference signal a second modified reference signal having a half-period phase shift from the first modified reference signal; a carrier signal generator for generating a carrier signal having a constant frequency; and a first comparator and a second comparator for comparing the first and the second modified reference signals to the carrier signal to generate frequency signals for driving the first pair of switches S1, S1', and the second pair of switches S2, S2', respectively.

In an embodiment, the 3L-FCM converter further comprises: a DC terminal; an AC terminal; and a flying capacitor; wherein the carrier signal generator is operable to generate the carrier signal having the constant frequency higher than 50 kHz, is connected at one end to the AC terminal and is connected at a second end to opposed terminals of the flying capacitor; wherein the carrier signal generator is operable to generate the carrier signal having the constant frequency higher than 50 kHz, is connected at one end to the opposed terminals of the flying capacitors and is connected at a second end directly to the DC terminal; and wherein the comparing allows for differential gating of S1/S1' and S2/S2' causes charging or discharging of the flying capacitor and allows for common gating of S1/S1' and S2/S2' by-passes the flying capacitor.

In an embodiment of the 3L-FCM converter, a voltage ripple on the flying capacitor has a peak-to-peak voltage ripple reduced by more than about 10% and up to about 35% of the voltage of the flying capacitor with respect to a peak-to-peak voltage ripple on a flying capacitor of a three-level flying capacitor multi-level power converter having: the same first and the second pair of switches; a single the modified reference signal; two of the carrier signal generators to produce a first carrier signal and a second carrier signal with a time drift of more than about 100 ns and up to about 1 μs; and the first comparator and second comparator comparing the single modified reference signal to the first carrier signal and the second carrier signal, respectively.

In an embodiment of the 3L-FCM converter further comprises a reference signal generator connected to the reference signal input and for generating the reference signal.

In an embodiment of the 3L-FCM converter, the switches S1, S1', S2, S2' are wide-bandgap fast power switches operating at a frequency of over about 50 KHz.

In an embodiment of the 3L-FCM converter, the second end of the pair of switches S2, S2' connected directly to the DC terminal is further connected to a pair of two high-voltage capacitors, and wherein the pair of high-voltage capacitors are connected at a second end to neutral and together.

In an embodiment, the 3L-FCM converter further comprises at least one additional converter having at least one pair of switches, wherein the switching signal generator is configured to generate switching signals for driving the switches of the multi-level converter and for driving at least the one pair of switches of the additional converter.

In an embodiment, the switching signal generator is operable to control the multi-level power converter for converting an alternative current input to a direct current output. Which may be identified as a 3L-FCM power rectifier.

In an embodiment, the switching signal generator is operable to control the multi-level power converter for converting a direct current input to an alternative current output. Which may be identified as a 3L-FCM power inverter.

The present further proposes a bidirectional back-to-back converter comprising; the 3L-FCM power rectifier as described above; the 3L-FCM power inverter as described above; wherein the AC input of the power rectifier is an AC power input of the bidirectional back-to-back converter; wherein the AC output of the power inverter is an AC power output of the bidirectional back-to-back converter; wherein a negative DC current of the DC output of the power rectifier is connected to a negative DC current of the DC input of the power inverter, wherein a positive DC current of the DC output of the power rectifier is connected to a positive DC current of the DC input of the power inverter, and wherein the neutral of the power rectifier is connected to the neutral of the power inverter; and wherein the power rectifier and the power inverter share the pair of high-voltage capacitors.

The present further proposes an embodiment of a three-phase variable frequency motor drive comprising; three of the 3L-FCM power inverter as described above; wherein a negative DC current of each one of the DC input of the power inverters are connected in parallel and wherein a positive DC current of each one of the DC input of the power inverters are connected in parallel; wherein the three of the power inverters share the pair of high-voltage capacitors and share a common the DC input; and wherein the AC output of each one of the power inverters are phase-shifted by 120 degrees from the AC output of each other ones of the power inverters.

The present further proposes an alternative embodiment of a three-phase variable frequency motor drive comprising: three of the bidirectional back-to-back converters as described above; wherein each one of the negative DC current of the three of the bidirectional back-to-back converters are connected in parallel and wherein each one of the positive DC current of the three of the bidirectional back-to-back converters are connected in parallel; wherein the three of the bidirectional back-to-back converters share the pair of high-voltage capacitors, and wherein the power AC power output of each one of the three of the bidirectional back-to-back converters are phase-shifted by 120 degrees from the AC power output of each other ones of the three of the bidirectional back-to-back converters.

In an embodiment of any one of the three-phase variable frequency motor drive described above, the switches of the three-phase variable frequency motor drive are driven by a common switching signal generator.

The present further proposes a method of power conversion using a three-level flying capacitor multi-level power converter, comprising: providing the three-level flying capacitor multi-level power converter having an input current, an output current, an AC terminal and a flying capacitor; generating a carrier signal having a constant frequency; generating a first modified reference signal defined as half of the sum of 1 and a reference signal; generating a second modified reference signal having a half-period phase shift from the first modified reference signal; and generating switching signals by comparing the first and the second modified reference signals to the carrier signal for driving pairs of power switches of the multi-level power converter for converting the input current to the output current and reducing an emanated noise of the converting.

In an embodiment of the method of power conversion, the reducing comprises a reduction of voltage ripple across the FC or an elimination of a first switching harmonic cluster or an elimination of odd multiples of switching harmonic clusters or a combination thereof.

In an embodiment of the method of power conversion, the generating the switching signals comprises: generating a first switching signal by comparing the first modified reference to the carrier signal for driving a first pair of the power switches operating at a frequency higher than 50 kHz, wherein the first pair of the power switches is connected at one end to the AC terminal and at a second end to opposed terminals of the flying capacitor; and generating a second switching signal by comparing the second modified reference to the carrier signal for driving a second half of the power switches operating at a frequency higher than 50 kHz, wherein the second pair of the power switches is connected at one end to the AC terminal and at a second end to opposed terminals of the flying capacitor.

In an embodiment of the method of power conversion, the second modified reference signal is equivalent to the first modified reference signal phase shifted by 180 degrees.

In an embodiment of the method of power conversion, the 180-degree phase shift is resulting from subtracting the first reference signal to a maximum amplitude of the first reference signal.

In an embodiment of the method of power conversion, the reduction of emanated noise of the converting results from a reduction of emanated electromagnetic interferences by about half.

In an embodiment of the method of power conversion, the reduction of emanated noise of the converting results from a reduction of ripples on the flying capacitor.

In an embodiment of the method of power conversion, the reduction of emanated noise of the converting results from a suppression of a first and odd multiples of a switching harmonic clusters of the three-level flying capacitor multilevel power converter, wherein the suppression generates an improved harmonic spectrum of the output voltage.

BRIEF DESCRIPTION OF THE DRAWINGS

The invention will be better understood by way of the following detailed description of embodiments of the invention with reference to the appended drawings, in which.

DETAILED DESCRIPTION

The following is a detailed description of the embodiments of the disclosure depicted in the accompanying drawings. The embodiments are in such detail as to clearly communicate the disclosure without limiting the anticipated variations of the possible embodiments and may encompass all modifications, equivalents, combinations and alternatives falling within the spirit and scope of the present disclosure. It will be appreciated by those skilled in the art that well-known methods, procedures, and components may not have been described in detail in the following so as not to obscure the specific details of the proposed invention.

Figure 1A:
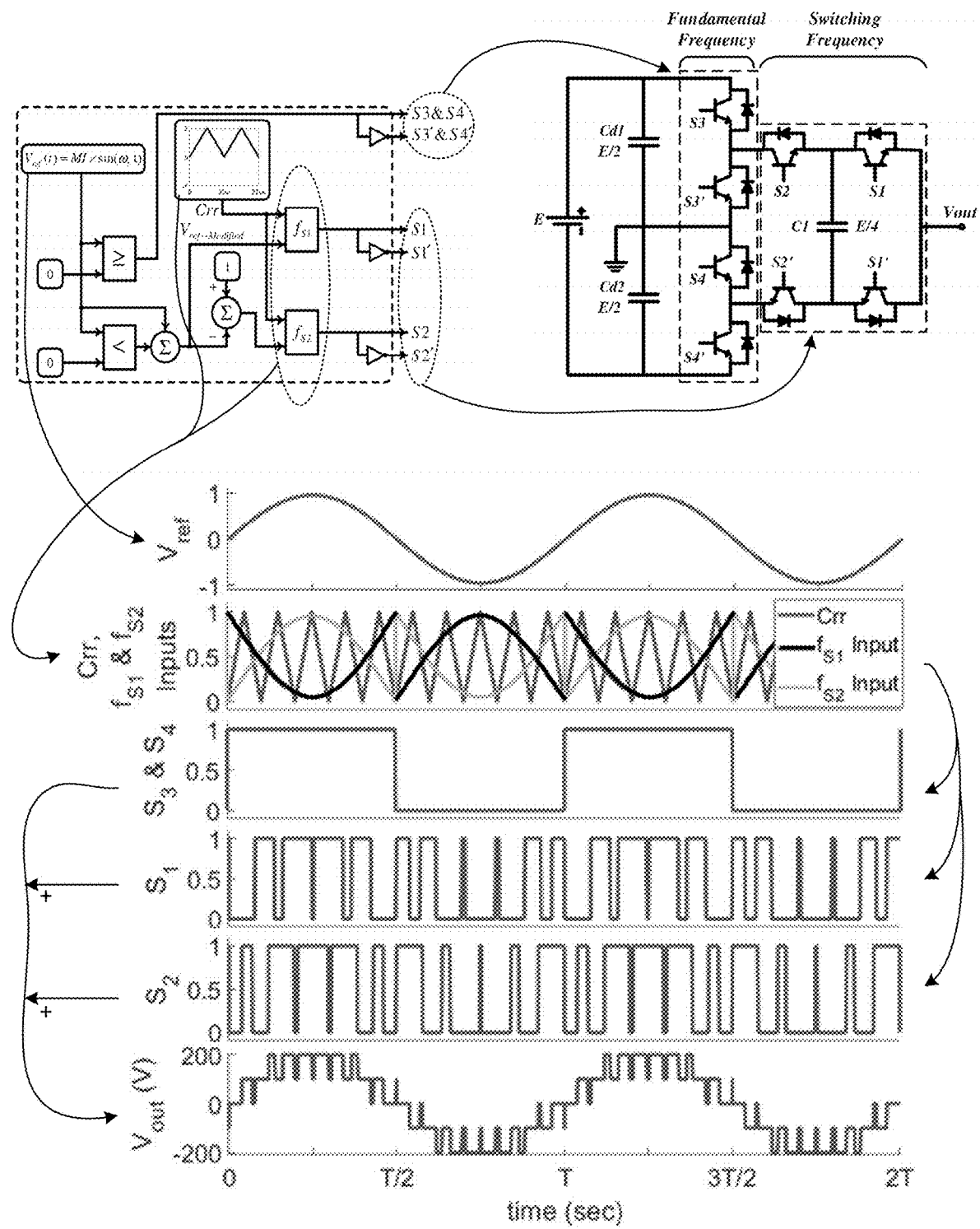
FIG. 1A is a schematic representation of a single-carrier sensor-less PWM method for the 5L-ANPC converter presented in the prior art.
Figure 1B:
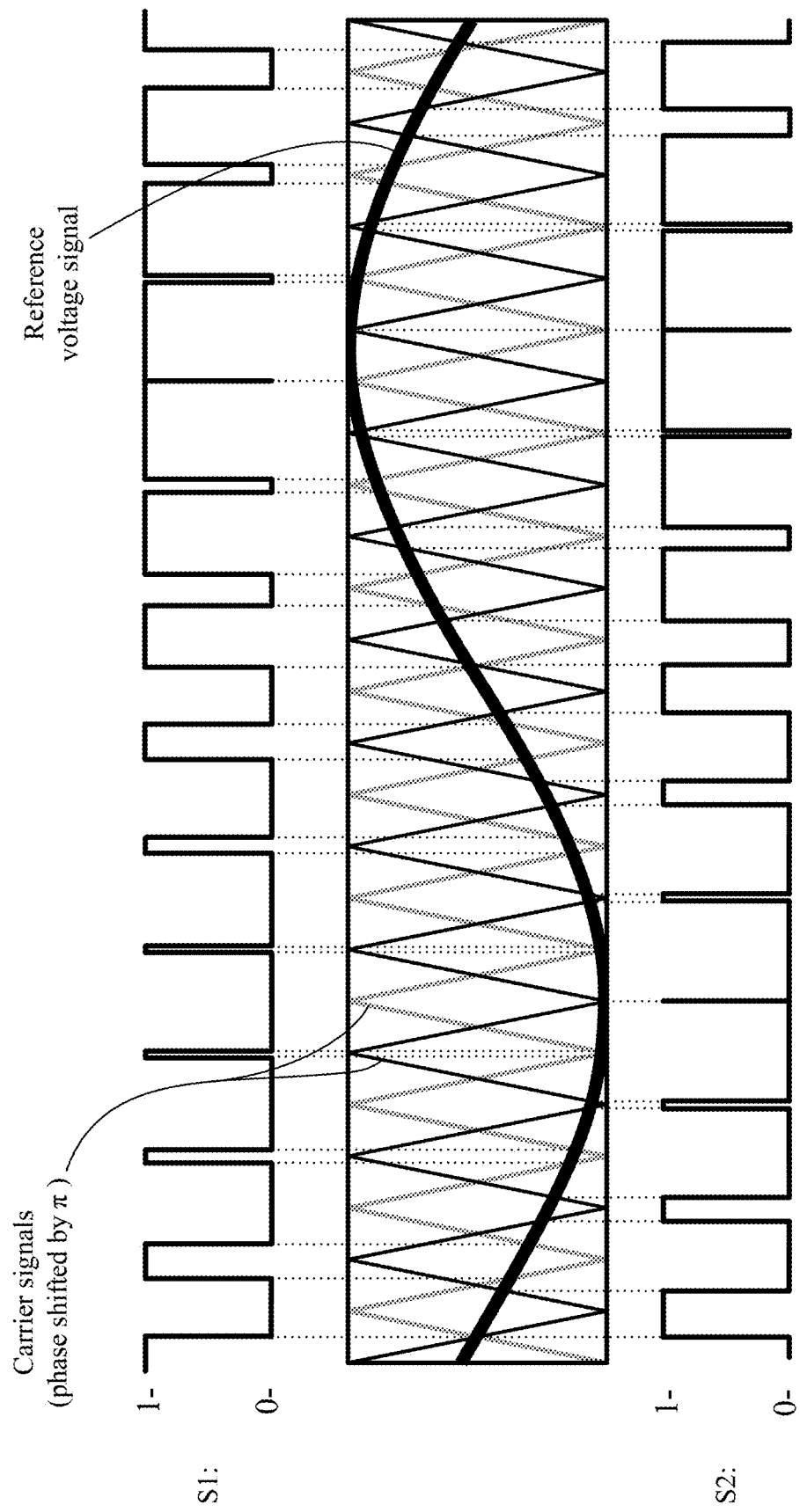
FIG. 1B is a schematic representation of a conventional two-carrier signal modulation method for 3L-FCM converter as used in the prior art.

As fast switches, such as silicon carbide (SiC) or gallium nitride (GaN) switches are becoming more affordable, more and more power electronics apparatuses are now using fast switches in order to improve efficiency and reduce switching losses. However, replacing standard switches with these faster SiC and GaN switches, which can be operated at high switching frequency (e.g., higher than 50 kHz), can cause significantly higher EMI. In order to achieve efficient operation of wide-bandgap (WBG) based three-level flying capacitor multicell (3L-FCM) converter and to get rid of the potential issue of small drift between the carriers leading to unsymmetrical switching signals of power devices and higher or more significative voltage ripple across the flying capacitor (FC), an advanced but simplified modulation method is proposed herein, which can require improving the output voltage spectrum and can reduce the computational burden at the same time. In order to achieve this goal, some of the main challenges and issues to be solved are listed in the following:

1) Conventional pulse width modulation (PWM) methods of the prior art used for FCM converters normally employ multiple phase-shifted or level-shifted carrier signals to generate suitable switching signals for the power devices. As illustrated in FIG. 1A, the 3L-FCM converter normally requires the use of two carrier signals to generate switching signals of the power devices. In those conventional cases, it has been identified that employing such multi-carrier modulation methods in the WBG based 3L-FCM converters is challenging due to the fact that any small drift between the carriers, which can be significant because of high switching frequency of the WBG devices, leads to unsymmetrical switching signals of power devices and to higher-voltage ripples across the FC, 2) Conventional PWM methods of the prior art can employ closed-loop active voltage balancing controllers or phase-shifted multi-carrier technique in order to regulate FC voltage to the desired value in FCM converters. Even though phase-shifted multi-carrier technique provides sensor-less voltage balancing of the FC, it requires n−1 carrier signals which are shifted by $2\pi/(n-1)$ for n-level FCM converters, where n≥3 is the number of output voltage levels of FCM converter. Conventional active voltage balancing methods also require flying capacitor voltage sensors and closed-loop voltage controllers to balance the flying capacitor's voltage which leads to increase in complexity and computational burden of overall modulation method; and 3) Emanated EMI of WBG based converters are much higher than Silicon based counterparts due to high switching frequency and high dv/dt of WBG devices.

Applicant developed the proposed sensor-less single-carrier modulation method for 3L-FCM converter that may require only one PWM carrier signal that can be compared to two modified reference signals extracted from an original respective reference signal by using logic functions that can provide switching signals to the switches of a 3L-FCM, where both of the reference signals can be based on a same original reference signal. This proposed method can enable:

1) Generating all twelve corresponding switching signals of the three-phase 3L-FCM converter with a single carrier signal, which may no longer have the potential to induce any drift between carriers and can also lead to simplified implementation of the proposed modulation method in one or more digital signal controller (DSC) or microprocessor or field-programmable gate array (FPGA) circuits or a combination thereof;

2) Utilizing mathematically supported (i.e., proven) sensor-less voltage balancing of the FC by using one carrier signal; and 3) Canceling out the first and odd multiples of switching harmonic clusters or reducing the emanated EMI or improving the output voltage harmonic spectrum or a combination thereof.

These results, enabled by some embodiments of the applicant's proposed method, can allow to respectively solve or mitigate all three of the main challenges previously mentioned. Embodiments of the sensor-less single-carrier modulation method for 3L-FCM converter can further allow for an even loss distribution between all the power switches of the 3L-FCM converter, which can lead to an increase of the reliability of the converter. It will be appreciated by someone skilled in the art that, since the proposed method only uses one carrier to provide the switching signals of the 3L-FCM converter, various EMI suppression methods including random PWM method and dithering PWM method can be applied to the proposed single-carrier PWM method for the 3L-FCM converter for EMI suppression purposes. It will be appreciated that the proposed method can allow to automatically regulate the dc-link capacitor voltages and the flying capacitor, which implies that all of the capacitors voltage sensors can be eliminated and that only one PWM timer and logic functions can be required. Therefore, low-cost microcontrollers (e.g., ATMEL ATmega8 from aspect of a number of timers) or complex programmable logic devices (CPLD) or logic circuits can be used to implement the proposed switching method. The possible applications for the proposed method can be but are not limited to variable frequency drives (VFD), active-front-end (AFE) rectifiers, electric vehicle off-board battery chargers; renewable energy conversion systems such as photovoltaic (PV) and wind energy conversion systems, grid-connected power inverters; uninterruptible power supplies (UPS); DC-AC inverters; a combination thereof, and more. Although some readers may find the proposed method to be mere simplification of the conventional methods, it will be appreciated by someone skilled in the art that such a novel, improved and optimized method requires significant research and development to ensure it is stable and reliable.

Figure 2A:
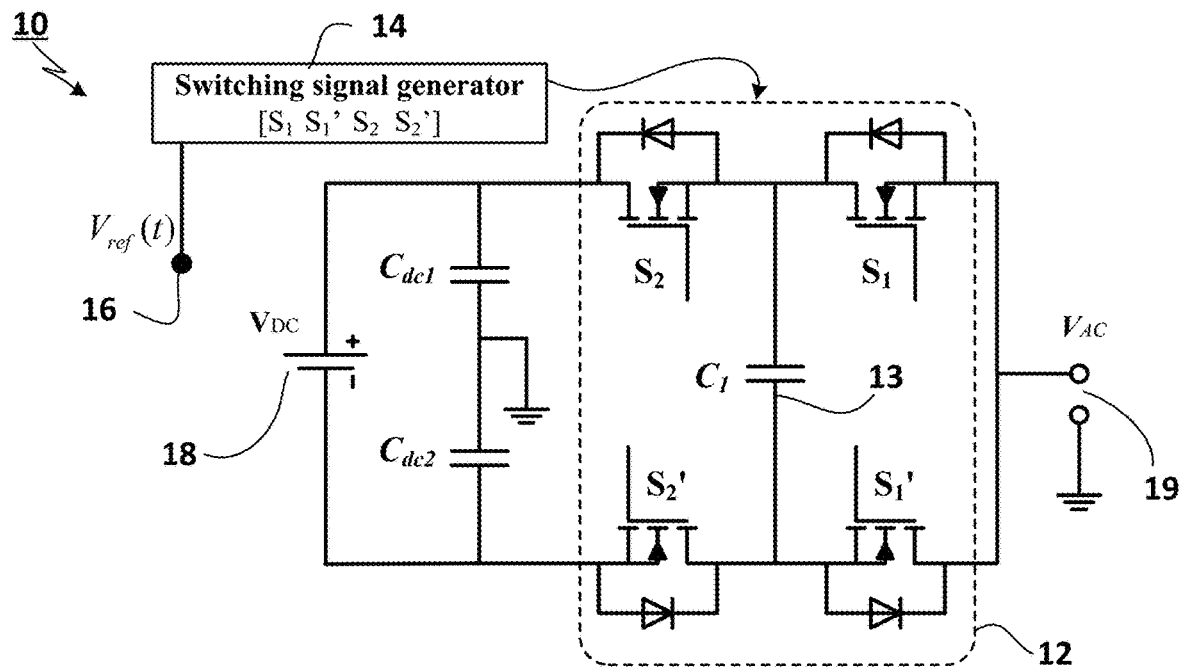
FIG. 2A is a schematic circuit of a single-phase three-level flying capacitor multicell converter (3L-FCM) in a power inverter configuration, wherein the switches are controlled using the switching signal generator.
Figure 2B:
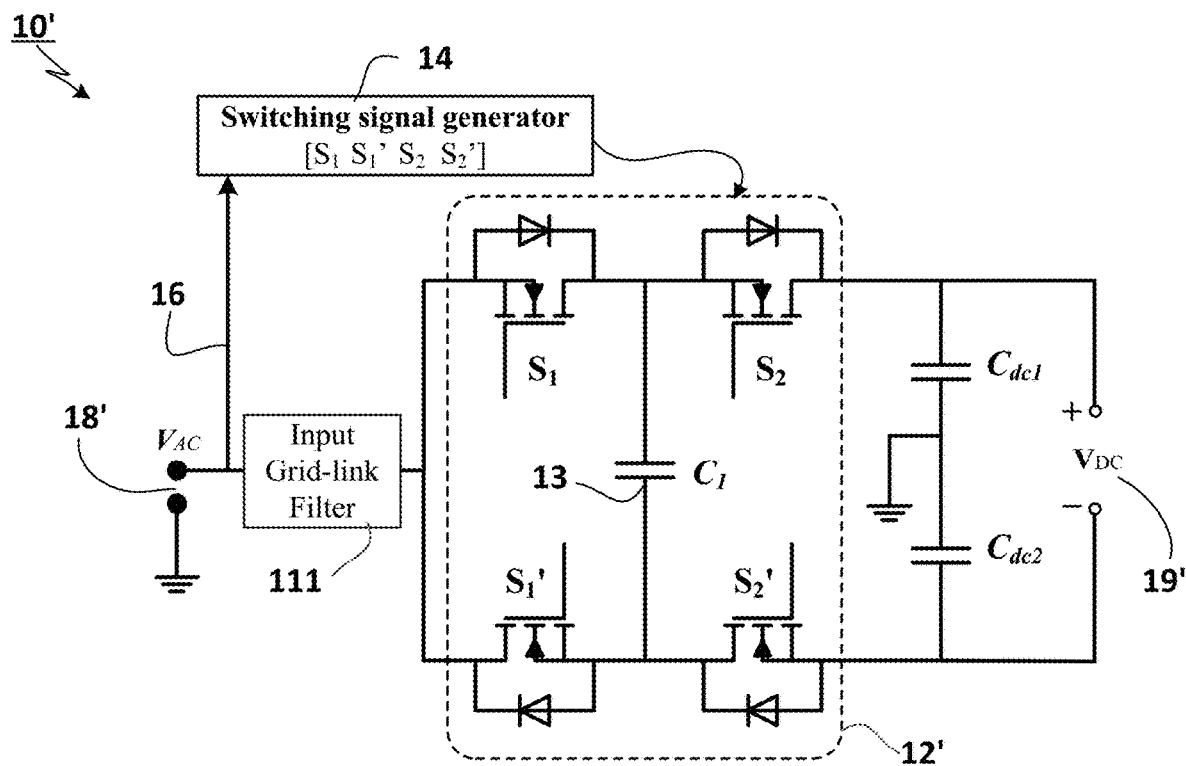
FIG. 2B is a schematic circuit of a single-phase three-level flying capacitor multicell converter (3L-FCM) in a power rectifier configuration, wherein the switches are controlled using the switching signal generator.

A three-level flying capacitor multicell (3L-FCM) converts an input current 18 to an output 19. It can be a 3L-FCM inverter 10 to convert as illustrated in FIG. 2A and can be a 3L-FCM rectifier 10' as illustrated in FIG. 2B. In both of these types of converters, a high-frequency switching cell 12 can comprise four directly or indirectly connected power switches corresponding to the switches S1, S'1, S2 and S'2 as well as a flying capacitor ($C_1$) 13 of the embodiments of FIGS. 2A and 2B. In some embodiments, the value of the DC capacitors and of the flying capacitors can be of E/2, half the value of the DC current (E). Some embodiments of the 3L-FCM rectifier can also comprise an input filter 111 (e.g., input grid-link filter) before the switch cells.

A 3L-FCM can comprise two pairs of high-frequency (e.g., $f_{sw}$>50 kHz) switches S1/S1' and S2/S2' each connected at one end to opposed terminals of a flying capacitor and at a second end to an AC/DC terminal (respectively), wherein differential gating of S1/S1' and S2/S2' can cause charging or discharging of the flying capacitor and common gating of S1/S1' and S2/S2' by-passes the flying capacitor 13. It can also comprise a switching signal generator 14 for generating switching signals for driving each high-frequency switches S1, S1', S2, S2' having at least one reference signal (i.e., one reference signal in the prior art and two reference signals in some embodiments of the method proposed herein).

Figure 2C:
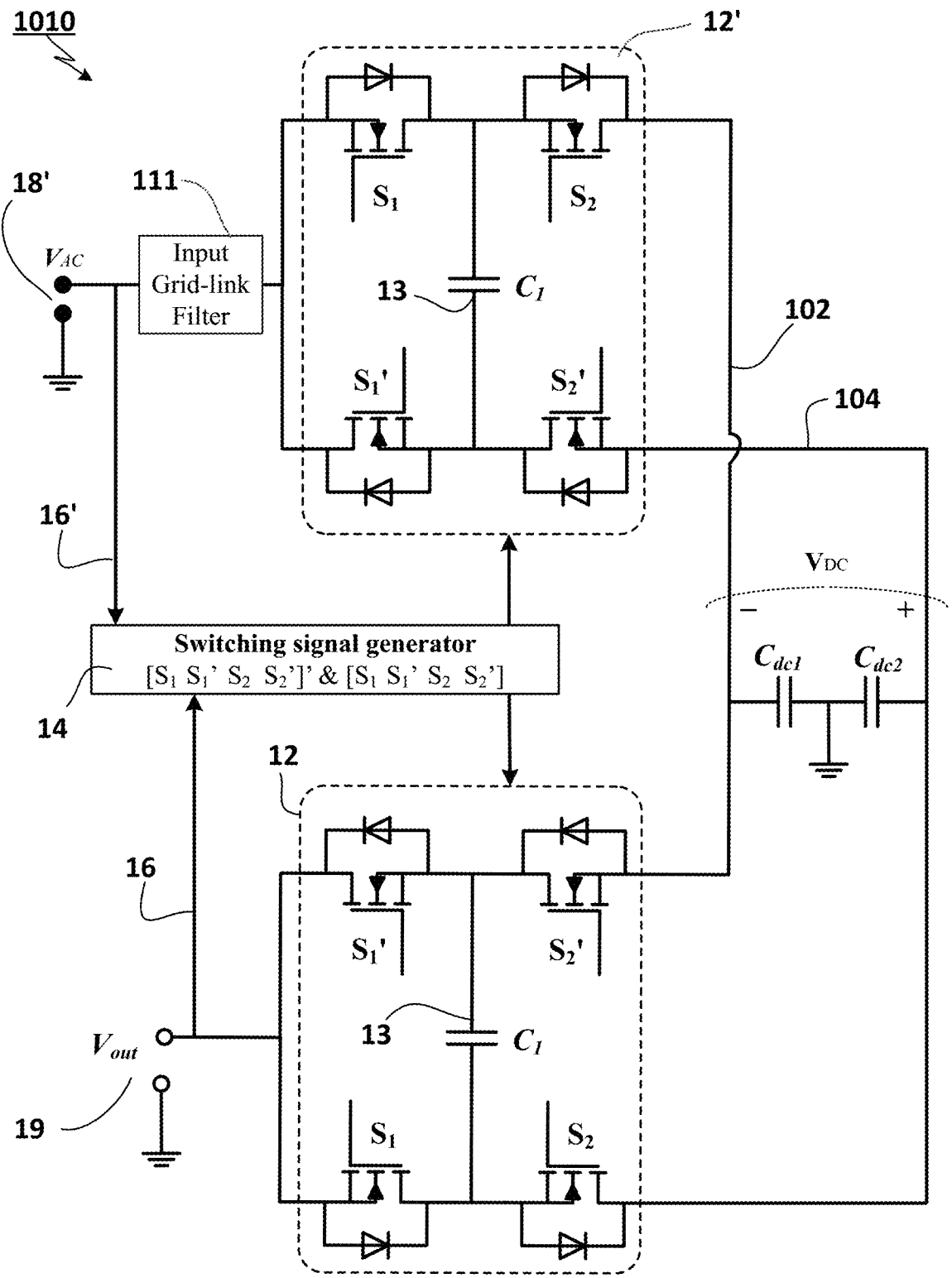
FIG. 2C is a schematic circuit of a single phase bidirectional back-to-back converter.

FIG. 2C presents one embodiment of a bidirectional back-to-back converter 1010 that can comprise a 3L-FCM inverter 10 (e.g. FIG. 2A) and a 3L-FCM rectifier 10' (e.g. FIG. 2B) with common high-frequency capacitors ($C_{dc1}$ and $C_{dc2}$) and connected at their DC terminal, with their respective negative DC current 104 connected together (negative DC current output of the 3L-FCM rectifier 10' to the negative DC current input of the 3L-FCM inverter 10) and their positive DC current 102 connected together (positive DC current output of the 3L-FCM rectifier 10' to the positive DC current input of the 3L-FCM inverter 10). In such a bidirectional back-to-back converter configuration, the input 18' is an AC voltage and the output 19 is an AC output. This embodiment can also comprise an input filter 111 (e.g., input grid-link filter) before the power rectifier switch cell 12'. Some embodiments can comprise a switching signal generator 14 for each one of the switching cells 12 and 12' or a single switching signal generator for both cells.

Figure 3A:
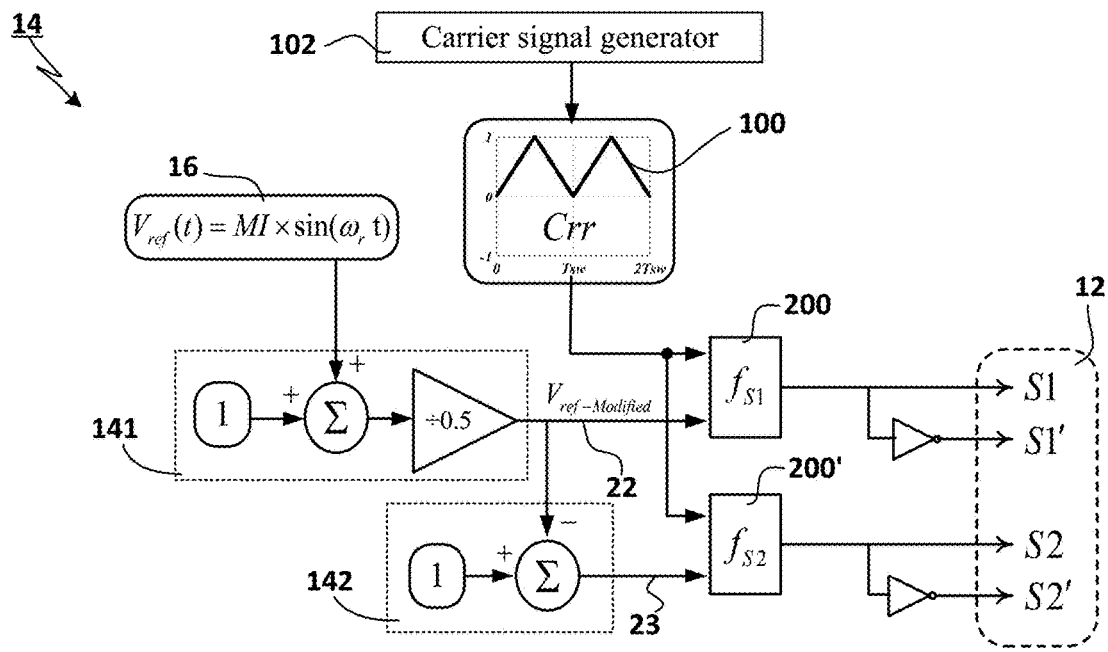
FIG. 3A is a schematic circuit of the proposed single-carrier modulation method including a logic equation-based comparator.

FIG. 3A presents an exemplary embodiment of the switching signal generator 14, which can comprise a carrier signal generator 102 for generating at least one carrier signal (i.e., two carrier signals in the prior art and one carrier signal 100 in some embodiments of the method proposed herein) having a constant frequency and a plurality of comparators (200 and 200') connected to and for comparing a carrier signal 100 and modified reference signals 22 or 23. In some embodiments of the proposed method, generating a switching signal a can comprise generating a first modified reference signal 22 from a reference signal 16 using a first part of a logic-gate circuitry 141, generating phase-shifted second modified signal 23 having a half-period phase shift ($\pi$ rad or 180 degrees) from the first modified reference signal 22 using a second part of a logic-gate circuitry 142, comparing these modified reference signals to the same single carrier signal 100 to generate a comparison output connected to respective gates of the high-frequency switches S1/S1' and S2/S2' using the comparators (200 and 200').

Figure 5A:
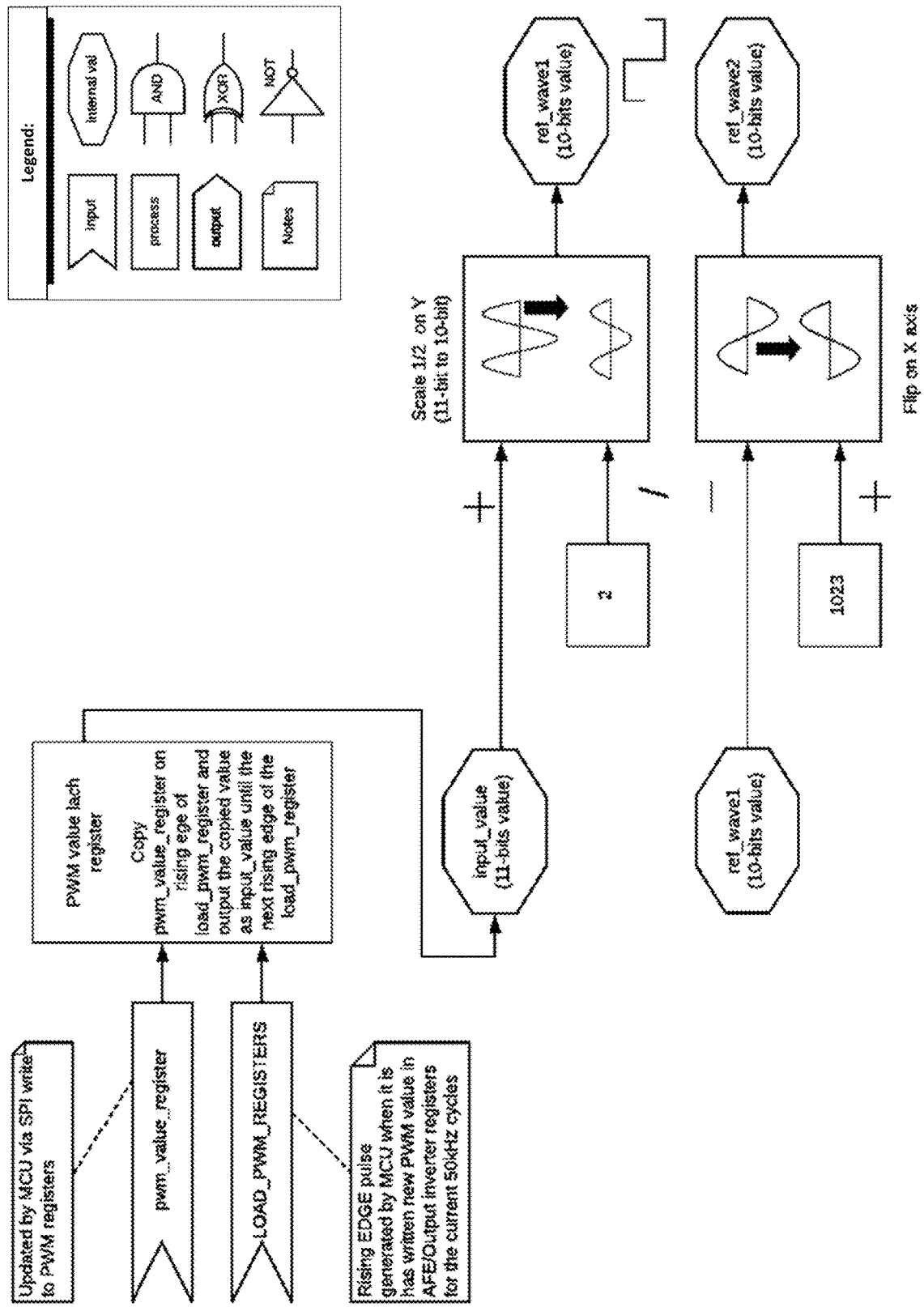
FIG. 5A is the schematic diagram of the proposed single-carrier sensor-less modulation method for the 3L-FCM converter.
Figure 5B:
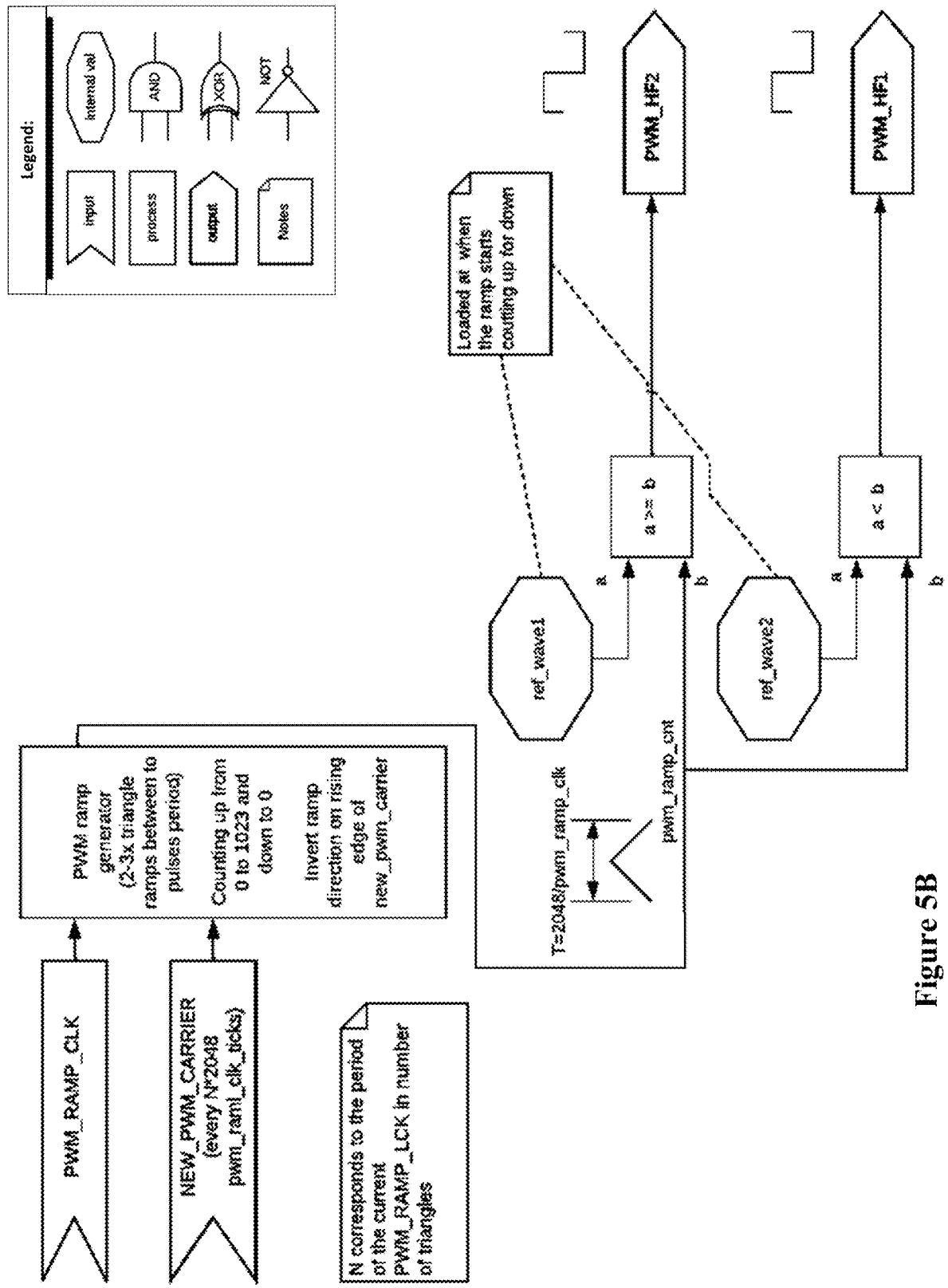
FIG. 5B is the digital implementation of the proposed single-carrier sensor-less modulation method in microprocessor or DSC or FPGA for the 3L-FCM converter.

The proposed single-carrier sensor-less PWM method for the 3L-FCM can be realized in part by a switching signal generator 14 that produces the various switching signals for driving the WBG switches of the 3L-FCM converter by comparing a single constant frequency carrier signal 100 to a modified version of the reference signal 16 (e.g., AC electric signal). In some embodiments, the reference signal 16 can be a variable, adaptive or fixed input of the switching signal generator 14 or can be data about or parameters of a variable or a fixed signal that can be stored in an internal or external memory unit (e.g., non-transitory memory) accessible and readable by said generator 14. FIG. 3A illustrates the schematic of an embodiment of such switching signal generator 14. It will be appreciated that, in some embodiments, the switching signal generator can be physically implemented using analog components or analogously digitally implemented for example in a microprocessor or DSC or FPGA or others are presented in examples of FIGS. 5A and 5B. As shown in the embodiment of FIG. 3A, the proposed single-carrier sensor-less modulation method may only require one PWM carrier signal 100. In addition, sensor-less voltage balancing of FC can be achieved, which can be attributed to a balancing of charging or discharging of a FC 13 in each PWM period or a combination thereof by applying an embodiment of the proposed single-carrier modulation method. Moreover, by employing an embodiment of the proposed modulation method, the first and/or odd multiples of switching harmonic cluster frequency can be canceled out, and then the frequency of a first switching harmonic cluster may be doubled. Hence, the emanated EMI can be reduced, and the values of the required passive components can be decreased.

It will be appreciated by someone skilled in the art that the prior art relating to a five-level active neutral point clamped (5L-ANPC), e.g. Abarzadeh et al. DOI: 10.1109/ISIE.2019.8781502, cannot be directly applied for a 3L-FCM. Among other distinctive features, the 5L-ANPC requires a switching signal generator 14 that is configured to generate eight switching signals for driving each of its eight switches (twice the number of switches for the 3L-FCM), where four of the eight switching signals, which are for four low-frequency switches, and the first modified reference signal are generated by zero-crossing comparators. In the modulation method of the 3L-FCM converter, while all four switches are high-frequency switches, their switching signals are all generated by PWM comparisons and there is no zero-crossing involved when generating any of the modified reference signals. The following, detailing the working principles of a proposed switching signal generator 14, allows to better understand and appreciate these distinctive features.

In an embodiment of the proposed modulation method, the reference signal (e.g., $V_{ref}=MI \times \sin(\omega_r t)$ where MI is an amplitude that may be between 0 and 1 and $\omega_r$ is an angular frequency of $V_{ref}$) can be used to generate a first modified reference signal ($V_{ref-modified}$) can be expressed as $$V_{ref-modified} = \frac{1+V_{ref}}{2},$$

Figure 3B:
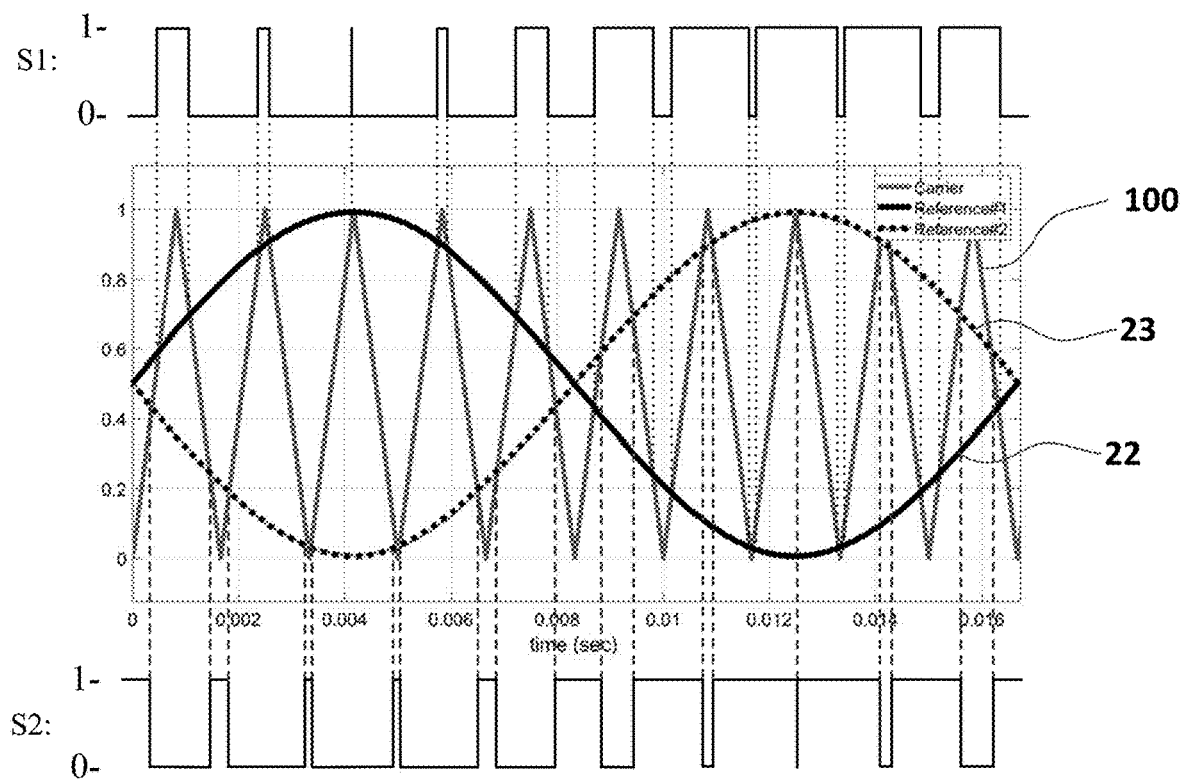
FIG. 3B is a schematic representation of the single-carrier signal and the two reference signals that are used and compared in the logic functions $f_{s1}$ and $f_{s2}$ of the logic equation-based comparator.

PWM carrier signal ($C_{rr}$). These signals can then be used by the logic functions $f_{s1}$ and $f_{s2}$ to generate the various switching signals (S1,S1') and (S2,S2'), where the logic functions may be defined as:

$f_{s1}=\{1, V_{ref-modified} \geq C_{rr}/0, V_{ref-modified} < C_{rr}\};$ $f_{s2}=\{1, 1-V_{ref-modified} \leq C_{rr}/0, 1-V_{ref-modified} \geq C_{rr}\};$ A schematic example of an embodiment of a comparator 200 having a logic function $f_{s1}$ and a comparator 200' having a logic function $f_{s2}$ of an embodiment of the proposed single-carrier sensor-less modulation method are shown in FIG. 3B. The inputs of $f_{s1}$ are the carrier signal 100 and a first modified reference signal ($V_{ref-modified}$) 22, while inputs of $f_{s2}$ are the carrier signal 100 and a second modified reference signal ($1-V_{ref-modified}$). It will be appreciated that in some embodiments, the frequency of the carrier signal 100 can be considerably (e.g., one or more magnitudes) higher than the frequency of the inputs 22 and 23. The inputs 22 and 23 can then be compared to the carrier signal 100 to generate the switching signals (S1,S1') and (S2,S2'), respectively, to drive and control each power switches of the high-frequency switching cell 12. The charging and discharging of FC can be balanced in each PWM period, and sensor-less voltage balancing of FC may be achieved by utilizing the proposed switching method. Furthermore, the frequency of first switching harmonic cluster may double and the first and odd multiples of the switching harmonic clusters can be significantly reduced (e.g., canceled out), which can lead to an improved harmonic spectrum of the output voltage 19.

With regard to the 3L-FCM converter circuit analysis described by Wilkinson et. al. (doi: 10.1109/TPEL.2006.882958) and the 3L-FCM converter shown in FIG. 2A, the switching functions for each power switches can be defined as follows, $s_i = \{1, \text{ if } S_1 \text{ or } S_2 \text{ is } ON/-1, \text{ if } S'_1 \text{ or } S'_2 \text{ is } ON \text{ for } i=1,2.$ Accordingly, the output voltage of the 3L-FCM converter can be expressed as $$v_O = \frac{E}{2} \cdot s_2 + \frac{1}{2} v_{C1} \cdot \{s_1 - s_2\},$$

where E is the voltage value of the current of the DC terminal.

Considering this last equation, the output voltage of the 3L-FCM converter can be −E/2, 0 or E/2. The voltage difference between two cells which can define FC voltage balancing behavior can be defined as follows, $$v_d = \frac{E}{2} - v_{C1}.$$

The steady state value of $$v_{C1} = \frac{E}{2}$$

when the FC can be balanced to its desired value. Therefore, $v_d=0$ when the FC can be regulated to its desired value in a steady state condition. Hence, the corresponding switching function of $v_d$ named the difference switching function ($s_d$) can be defined as $$s_d = \frac{1}{2}\{s_2 - s_1\}.$$

The behavior of the FC voltage balancing can be evaluated by using $s_d$ function. Moreover, the total switching function ($s_t$) which is the sum of the switching signals can be defined as $$s_t = \frac{1}{2}\{s_2 + s_1\}.$$

Figure 4:
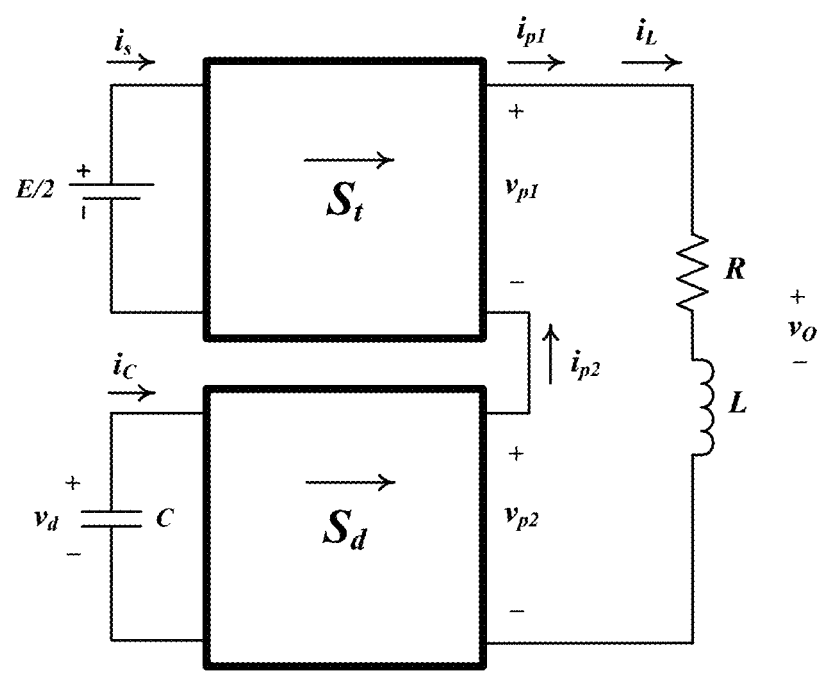
FIG. 4 is an equivalent decoupled circuit of the 3L-FCM converter by using the difference (d) and the total (t) parameters.

The behavior of the harmonic spectrum of the output voltage can be evaluated by using the $s_t$ function. Accordingly, the equivalent decoupled circuit of the 3L-FCM converter by using the parameters d and t is presented in FIG. 4. With regard to FIG. 4, the corresponding equations to the equivalent decoupled two-port circuits of the 3L-FCM converter are defined. Based on the two-port switching circuit theory and with regard to the fact that E/2 and $v_d(t)$ are the constant value in the steady state condition, the relation between input and output of the presented two-port switching circuits $S_t$ and $S_d$ can be expressed as $$\begin{cases} v_{p1}(t) = s_c(t) \cdot E/2 \\ i_s(t) = s_t(t) \cdot i_{p1}(t) \end{cases} \quad (1.1)$$

$$\begin{cases} v_{p2}(t) = s_d(t) \cdot v_d \\ i_c(t) = s_d(t) \cdot i_{p2}(t) \end{cases} \quad (1.2)$$

Accordingly, the frequency domain expression of (1.1) and (1.2) are as follows, $$\begin{cases} V_{p1}(\omega) = E/2 \cdot S_t(\omega) \\ I_s(\omega) = S_t(\omega) * I_{p1}(\omega) \end{cases} \quad (2.1)$$

$$\begin{cases} V_{p2}(\omega) = V_d \cdot S_d(\omega) \\ I_C(\omega) = S_d(\omega) * I_{p2}(\omega) \end{cases} \quad (2.2)$$

where * is the convolution operator in the frequency domain.

In order to evaluate conditions and requirements of the FC voltage balancing of the 3L-FCM converter the FC current $I_c(\omega)$ can be calculated by using (2.2). With regard to FIG. 4 as well as equations (2.1) and (2.2), $I_{p2}(\omega) = -I_L(\omega)$ is expressed as $$I_L(\omega) = \frac{V_O(\omega)}{Z(\omega)} = \frac{V_{p1}(\omega) + V_{p2}(\omega)}{Z(\omega)} \quad (3.1)$$

$$I_L(\omega) = \frac{V_{p1}(\omega) + V_{p2}(\omega)}{Z(\omega)} = \frac{E/2 \cdot S_t(\omega) + V_d \cdot S_d(\omega)}{Z(\omega)} \quad (3.2)$$

$$I_C(\omega) = -I_L(\omega) * S_d(\omega) = -\left(\frac{E/2 \cdot S_t(\omega) + V_d \cdot S_d(\omega)}{Z(\omega)}\right) * S_d(\omega) \quad (3.3)$$

In steady state condition ($\omega=0$), the FC current should be zero to prove the FC voltage balancing. Hence (3.3) is solved for $I_c(\omega)|_{\omega=0}=0$.

$$\frac{V_d}{E} = \frac{\text{Re}\left\{\int_0^\infty S_t(\xi) Z(\xi) \overline{S_d(\xi)} d\xi\right\}}{2\text{Re}\left\{\int_0^\infty \frac{|S_d(\xi)|^2}{Z(\xi)} d\xi\right\}} \quad (4)$$

Eq. (4), which defines the FC voltage unbalance of the 3L-FCM converter, should be minimized to achieve the FC voltage balancing. Hence, the numerator of (4) should be zero while the denominator of equation (4) should not be a zero to guarantee voltage balancing of the FC. Therefore, following conditions should be met in equation (4) to guarantee self-balancing of the FC voltage in the 3L-FCM converter.

$|S_t(\omega)||S_d(\omega)| \approx 0$ (5)

$Z(\xi)$ has "Real" value

Equation (5) is satisfied if the harmonic clusters of $s_d$ and $s_t$ are far enough from each other and may not have any overlapping harmonics. Moreover, the impedance of the load which is the output passive filter should have real value (resistive value) at switching frequency.

In order to evaluate validity of $|S_t(\omega)||S_d(\omega)| \approx 0$ by applying the proposed single-carrier modulation method to the 3L-FCM converter, Fast Fourier transform (FFT) of both $s_d$ and $s_t$ by employing the proposed single-carrier modulation method for the 3L-FCM converter are presented as in the following.

Figure 6A:
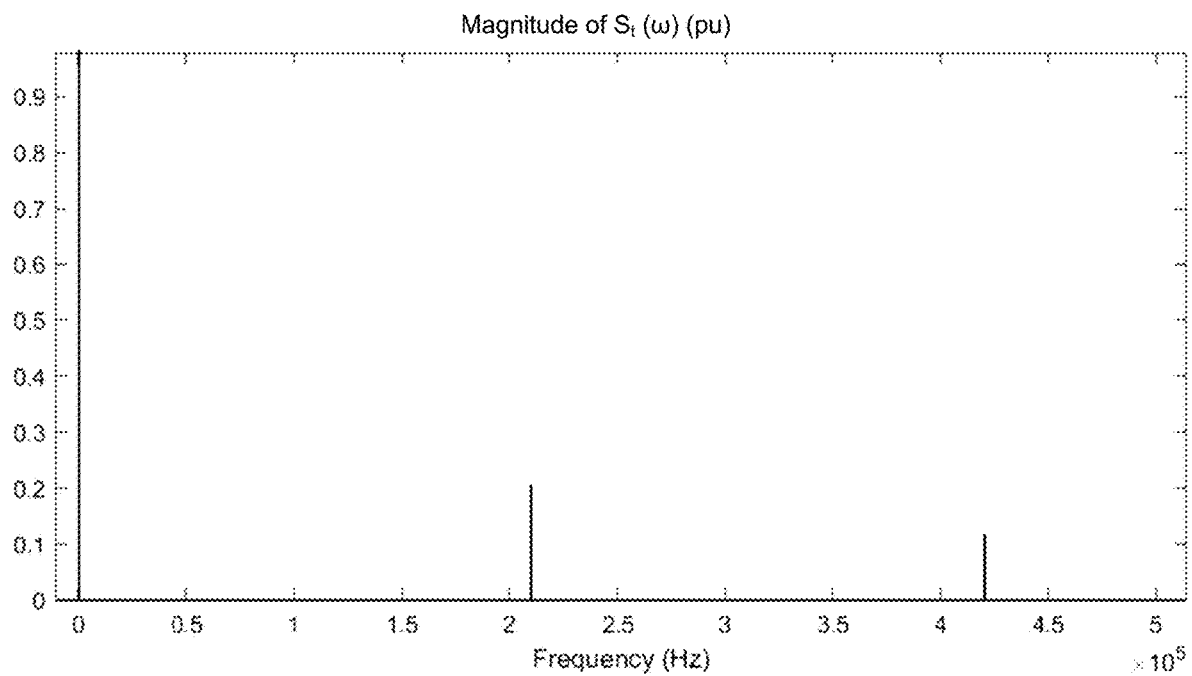
FIG. 6A is the fast Fourier transform (FFT) of the total switching function ($s_t$) by employing the proposed single-carrier modulation method for the 3L-FCM converter for the switching frequency of 105 KHz.
Figure 6B:
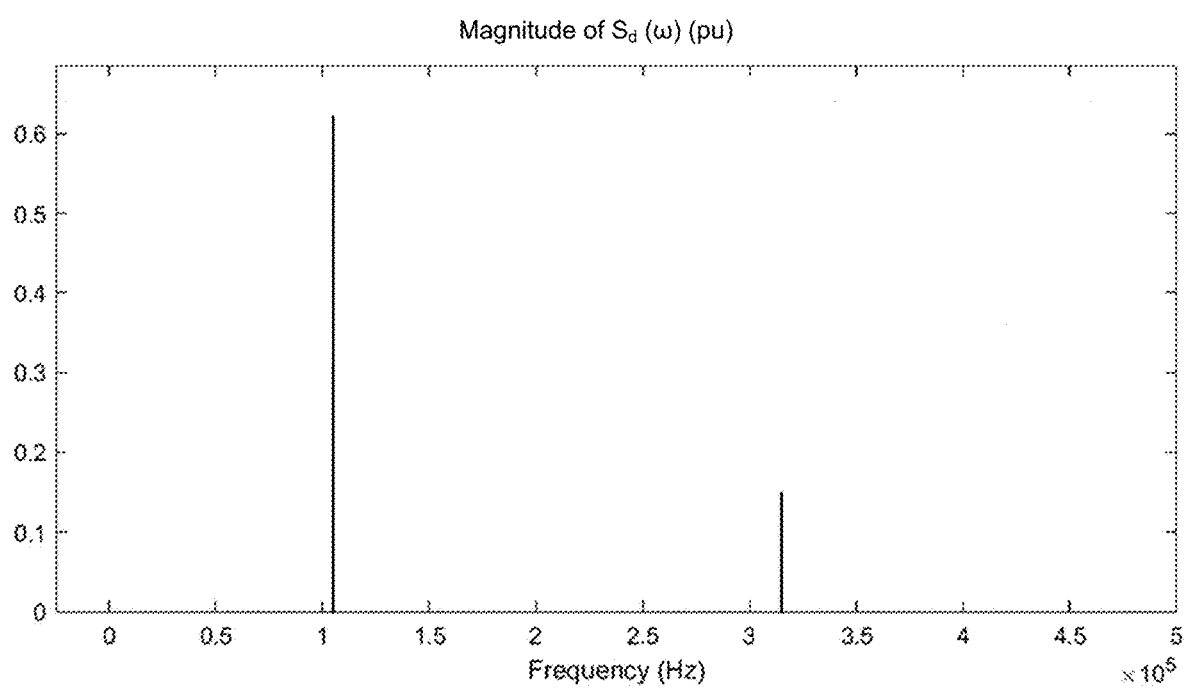
FIG. 6B is the FFT of the difference switching function (sa) by employing the proposed single-carrier modulation method for the 3L-FCM converter for the switching frequency of 105 kHz.

In addition, with regard to an embodiment having a FFT as presented in FIGS. 6A and 6B for the total switching function ($s_t$) and difference switching function ($s_d$), respectively, they can be defined for equivalent decoupled two-port circuits of the 3L-FCM converter by using d and t parameters. It is worth mentioning that the difference switching function ($s_d$) represents the voltage balancing of the capacitor and the total switching function ($s_t$) represents the output voltage harmonic spectrum. Considering respective equation total and difference switching functions ($s_t$ and $s_d$), their harmonics for an embodiment with a switching frequency of about $f_{SW}$=105 kHz and a modulation index of about M=0.98 are shown in the embodiment of FIGS. 6A and 6B. In FIG. 6A, the total switching function ($s_t$), which presents the output voltage harmonic spectrum of this embodiment, which can have harmonic clusters at about $2k \cdot f_{SW}$ where k is an integer number. Hence, odd multiples of the switching harmonic clusters can be canceled out at the output voltage frequency spectrum and the first switching harmonic cluster of the output voltage can be shifted to about $2f_{SW}$. Therefore, the observed output voltage spectrum can be obtained by applying the proposed single-carrier sensor-less modulation method. In addition, as shown in FIG. 6B, the difference switching function ($s_d$), which presents charging/discharging of the capacitor, can have a switching harmonic clusters at about $(2k-1) \cdot f_{SW}$, where k=1, 2, . . . . Hence, the 3L-FCM converter capacitor can be charged and discharged by switching frequency and the even multiples of the switching harmonic clusters can be canceled out at the difference switching function ($s_d$). Hence, the total switching function ($s_t$) and difference switching function ($s_d$) can be decoupled and in some cases can be completely decoupled. Accordingly, as can be seen in the embodiment of FIGS. 6A and 6B, the harmonic spectrum of $s_t$ can be comprised of fundamental frequency and even multiples of the switching frequency whereas the harmonic spectrum of $s_d$ contains odd multiples of the switching frequency. Hence, as presented in the embodiment of FIGS. 6A and 6B and as someone skilled in the art would appreciate, the harmonic spectrums of $s_d$ and $s_t$ can be far enough from each other and therefore may not have any overlapping harmonics and the condition of $|S_t(\omega)||S_d(\omega)| \approx 0$ can be completely satisfied and, considering equation (5), the sensor-less capacitor voltage balancing can be obtained by applying the proposed single-carrier sensor-less modulation method.

The other important achievement concluded from the harmonic spectrum analysis of the total switching function of $s_t$ can be an elimination of the first and odd multiples of the switching frequency clusters from the output voltage harmonic spectrum of the 3L-FCM converter by employing the proposed single-carrier modulation technique. Hence, the emanated EMI can be significantly reduced, and the first switching harmonic cluster can be shifted to twice the switching frequency by applying the proposed single-carrier modulation method. The first and odd multiples of the switching harmonic clusters can be canceled out at the output voltage by employing the proposed modulation method. So, half of the generated switching harmonic clusters and their associated emanated EMI noises can be eliminated.

In order to satisfy the second condition of sensor-less voltage balancing of the FC, Z ($\xi$) should have "Real" value at the switching frequency which can be the impedance of the output filter of the 3L-FCM converter. By considering the proper design procedure for the output filter of the 3L-FCM converter, this condition can be met. Accordingly, with regard to (4) and (5), the 3L-FCM converter capacitor voltage self-balancing can be proved and obtained in steady-state condition by employing the proposed single-carrier sensor-less modulation method.

Figure 8:
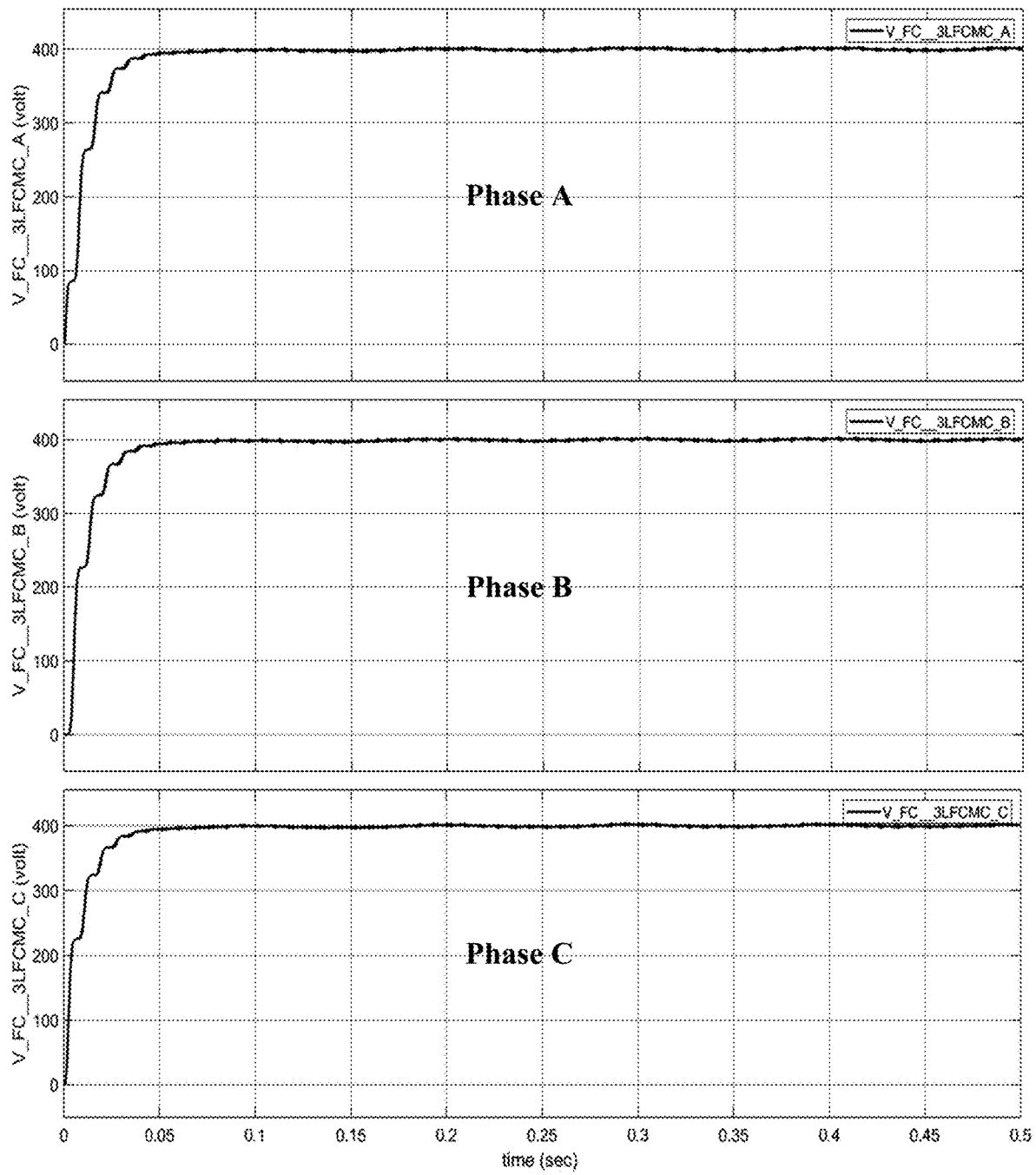
FIG. 8 shows simulated results showing the voltages of flying capacitors of the three-phase 3L-FCM converter during converter start-up and steady state operation for the switching frequency of 105 KHz.
Figure 9A:
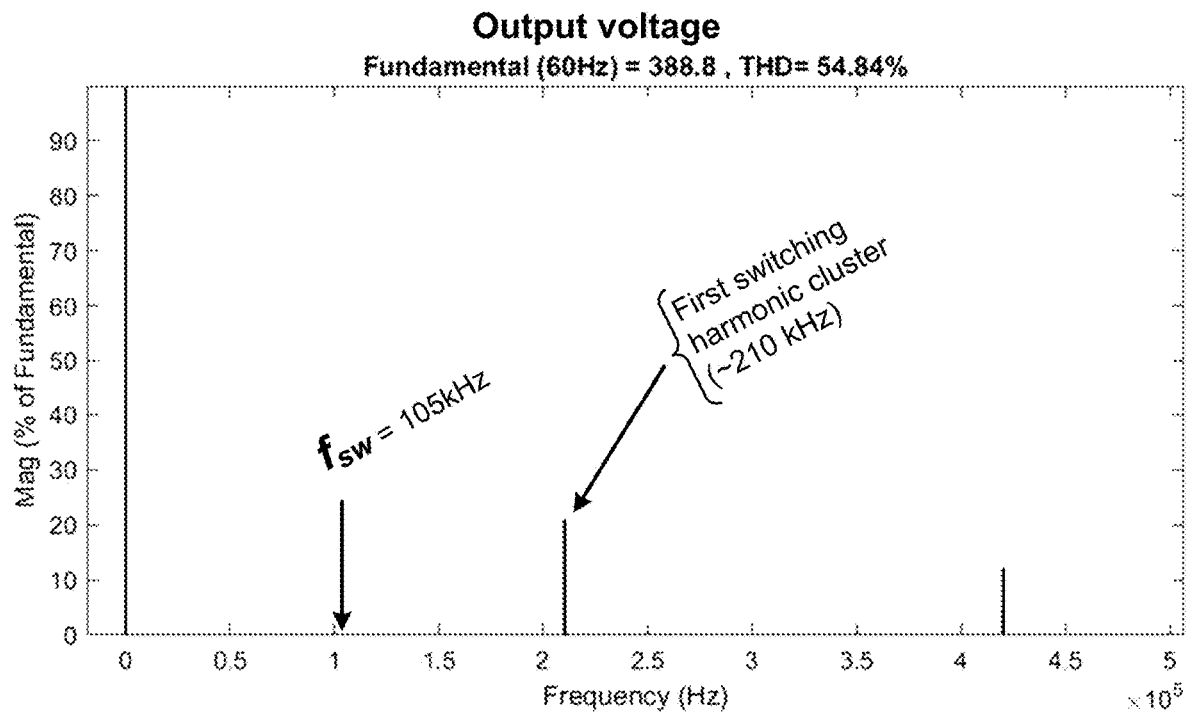
FIG. 9A shows the FFT analysis of the simulated output voltage of the 3L-FCM converter for the switching frequency of 105 kHz.
Figure 9B:
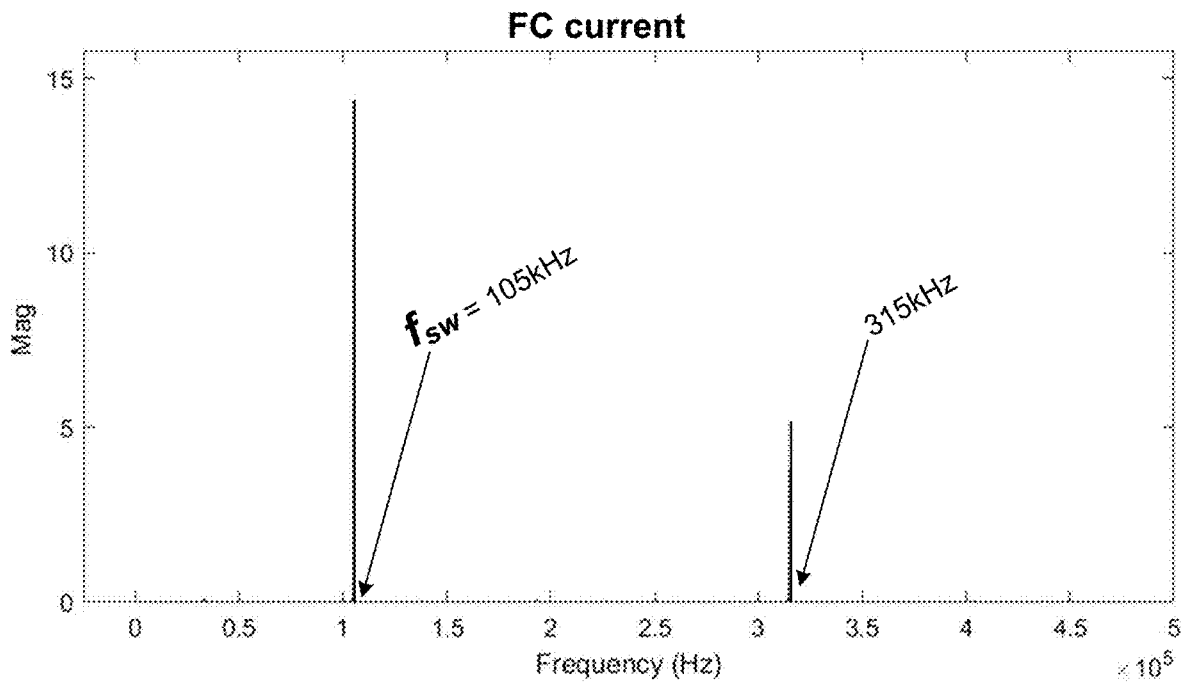
FIG. 9B shows the FFT analysis of the simulated FC current of the 3L-FCM converter for the switching frequency of 105 kHz.

FIGS. 8, 9A and 9B are results of simulations of an embodiment of a three-phase 3L-FCM converter utilizing the proposed single-carrier sensor-less PWM method, where the dc-link voltage is E=800 V, the switching frequency (i.e., a constant frequency of the carrier) is $f_{SW}$=105 kHz, and the value of the flying capacitor is $C_1$=30 μF. FIG. 8 presents the voltages of flying capacitors of all three phases of the simulated three-phase 3L-FCM converter during start-up (between 0 to about 0.05 seconds, where the voltage increases from 0 to about 400 volts) and steady state operation (after about 0.05 seconds) and shows the voltages of flying capacitors can be regulated to their desired values and can perform fast transient response at the start-up of the converter by employing the proposed single-carrier PWM method. The fast Fourier transform (FFT) analysis of the output voltage of the simulation of this embodiment of a 3L-FCM converter is shown in FIG. 9A showing the first switching harmonic cluster is shifted to about twice the switching frequency ($2 \times f_{SW}$=210 kHz) and the first and odd multiples of the switching harmonic clusters are canceled out. FIG. 9B presents the FFT analysis of the simulated FC current of the 3L-FCM converter by employing the proposed method, which shows that the flying capacitors are normally charged and discharged with the switching frequency which leads to completely decoupled harmonic spectrum from the output voltage harmonic spectrum. Someone skilled in the art will appreciate that FIG. 9A and FIG. 9B can verify the viability of the required condition of $|S_t(\omega)||S_d(\omega)| \approx 0$ for sensor-less voltage balancing of flying capacitors by applying the proposed single-carrier modulation method to the 3L-FCM converter. The first and odd multiples of the switching harmonic clusters are canceled out at the output voltage by employing the proposed modulation method. So, half of the generated switching harmonic clusters are eliminated. It will be appreciated by someone skilled in the art that the proposed method can allow to achieve an optimized output voltage quality with the same switching frequency by using an output passive filter having half the value required to achieve a comparable output voltage with the conventional method.

The various embodiments of the proposed method can be implemented to three-levels converters where the switching signal generator 14 can be used to control the switching signal of various types of converters, including all of the following embodiments. The converter can be and is not limited to a rectifier, an inverter, a MLC or a combination thereof. In some embodiments, the MLC is a three-level converter, a three-level inverter, a three-level rectifier, etc. It will be appreciated that a three-level flying capacitor multicell (3L-FCM) converter, can also be used as a power inverter (DC in, AC out) as illustrated in FIG. 2A, a power rectifier (AC in, DC out) as illustrated in FIG. 2B and/or a combination thereof. Combinations can include embodiments such as a three-level hybrid variable-frequency AC power converter by connecting the output of an alternative rectifier (e.g., a five-level rectifier) to the input of a three-level inverter controlled using an embodiment of the proposed sensor-less single-carrier modulation method or by connecting the output of a three-level rectifier controlled using an embodiment of the proposed sensor-less single-carrier modulation method to the input of an alternative inverter (e.g., a five-level inverter). In some embodiments, the MLC is used as a three-phase variable frequency motor drive. In some embodiments, a three-phase variable frequency motor drive comprising three MLCs can have one switching signal modulator 14 for all of the switches of the converters, where the reference signal 16 is used to generate tree phase-shifted output signals (120° phase shift between each of these reference signals) be compared to the same carrier signal 100 to drive the three-phase variable frequency motor.

Figure 7A:
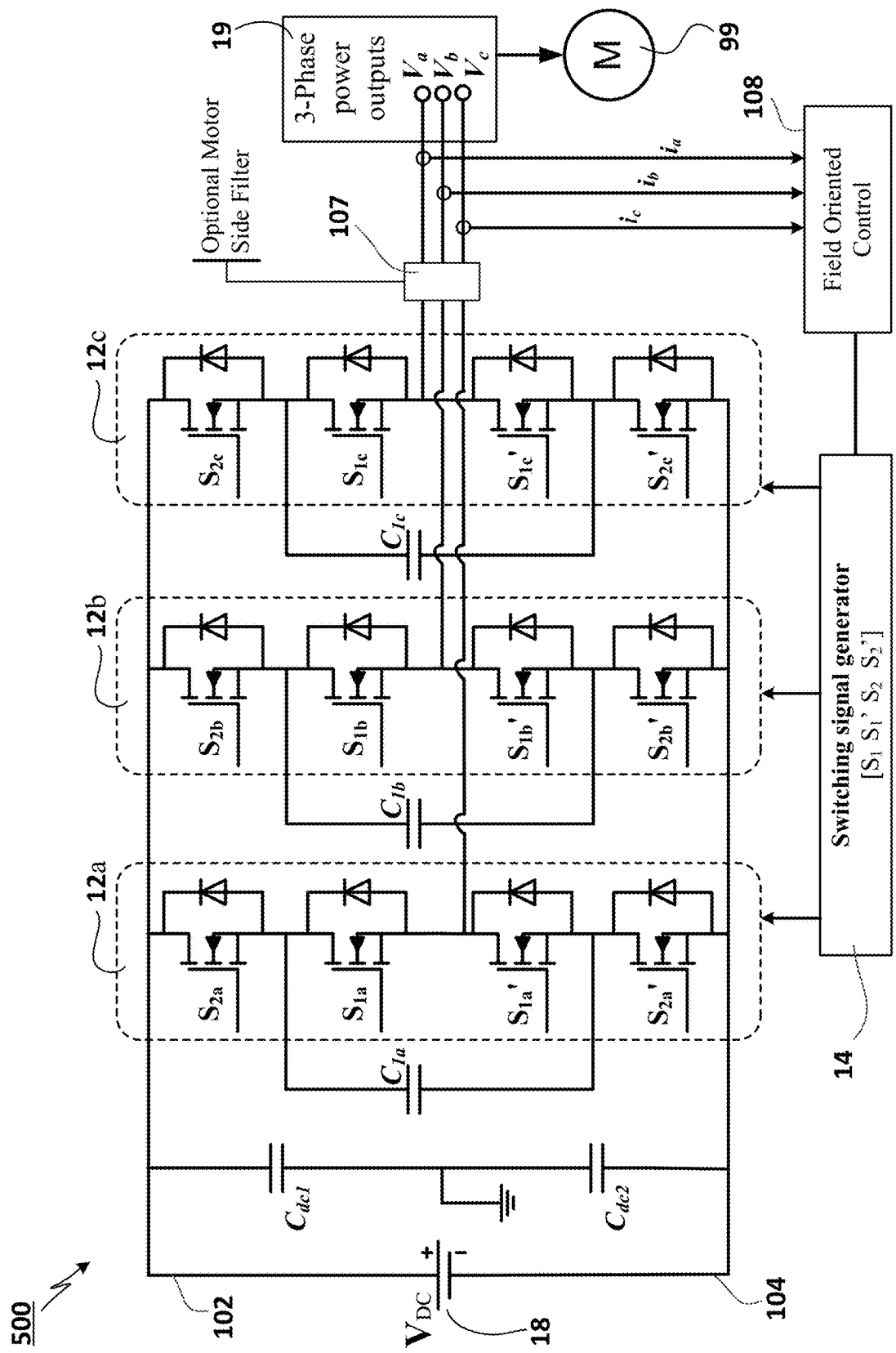
FIG. 7A shows a schematic illustration of three 3L-FCM inverters in a three-phase variable frequency motor drive configuration, where the switches are controlled with the signal of the switching signal generator.

FIG. 7A shows an embodiment of such a three-phase variable frequency motor drive 500 that utilizes three switch cells 12a, 12b and 12c of three-level inverters connected in parallel at their positive DC current 102 and negative DC current 104 connections to generate three AC power outputs ($V_a$, $V_b$ and $V_c$) phase-shifted by about 120 degrees used to drive a three-phase motor 99. In this embodiment, the three switch cells 12a, 12b and 12c are sharing a common DC power input 18 ($V_{DC}$) and a pair of high-voltage capacitors ($C_{dc2}$ and $C_{dc1}$). This embodiment can also comprise a motor side filter 107 before the motor inputs and a field orientated control 108 for controlling the three-phase variable frequency motor drive output in order to adjust the switching signal generated by the switching signal generator and generate proper output voltage and frequency to control the motor.

Figure 7B:
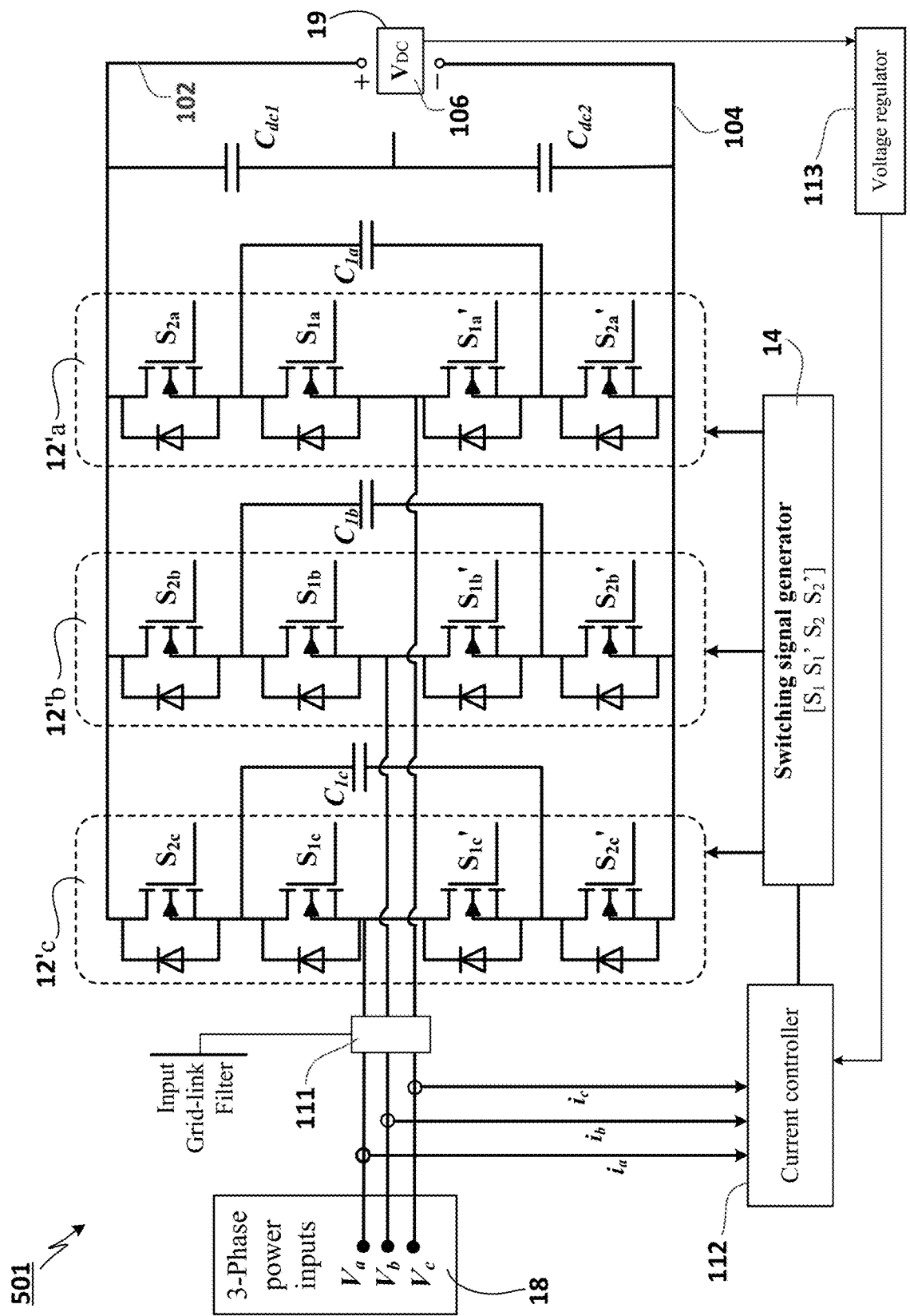
FIG. 7B shows a schematic illustration of three 3L-FCM rectifiers in a three-phase active-front-end (AFE) rectifier configuration, where the switches are controlled with the signal of the switching signal generator.

It will be appreciated that the switching signal generator can be used to drive the switches of MLC in a three-phase active-front-end rectifier configuration. FIG. 7B shows one embodiment of such a three-phase rectifier 501 that utilizes three switch cells 12'a, 12'b and 12'c of three-level inverters connected in parallel at their positive current 102 and negative current 104 connections to generate a single DC power output 106. In this embodiment, while each of the three switch cells 12' have an AC power input 18 ($V_a$, $V_b$ or $V_c$), they share a pair of high-voltage capacitors and a single DC power output $V_{DC}$ 106. Some embodiments can also comprise an input filter 111 (e.g., input grid-link filter) before the switch cells; a current controller 112 for controlling the AC input currents and a voltage regulator 113 to adjust the switching signal generated by the switching signal generator and regulate the output DC voltage to its desired value.

Figure 7C:
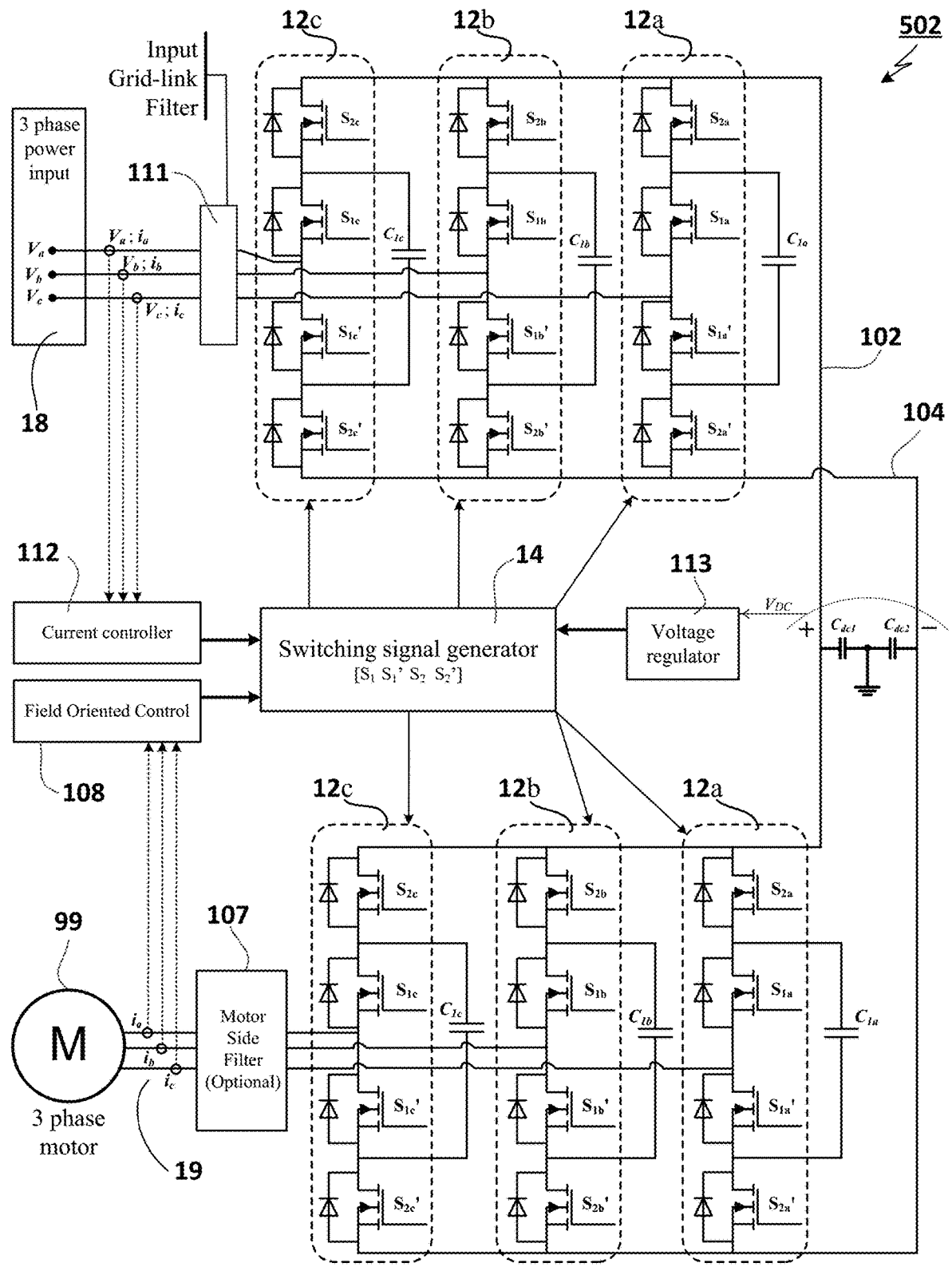
FIG. 7C shows a schematic illustration of six 3L-FCM converters in a three-phase bidirectional back-to-back converter configuration, where the switches are controlled with the signal of the switching signal generator.

FIG. 7C shows one embodiment of a three-phase bidirectional back-to-back converter 502 that can comprise a MLC of FIG. 7A and a MLC of FIG. 7B with common high-frequency capacitors and connected at their DC terminal (negative DC current 104 to negative DC current and positive DC current 102 to positive DC current). In this configuration, the inputs are three AC voltages $V_a$, $V_b$ and $V_c$ (one for each input switching cells) and the outputs are three AC outputs 106 phase-shifted by 120 degrees used to drive a three-phase motor 109. This embodiment can also comprise an input filter 111 (e.g., input grid-link filter) before the power rectifier switch cells 12'; a current controller 112 for controlling the AC input currents, a voltage regulator 113 for regulating the DC link voltage, a motor side filter 107 before the motor inputs and/or a field orientated control 108 for adjusting the AC outputs. The described embodiments can comprise a switching signal generator for each one of the switching cells, a single switching signal generator for all of the cells or any configuration in between.

While the MLC presented in this description was focused on 3L-FCMs, it will be appreciated that the MLC can be any alternative configuration that comprises a flying capacitor, including; flying capacitor multicell (FCM) converters, stack multicell (SM) converters, N-level ANPCs, full-bridge modular multilevel converters (FB-MMC), half-bridge modular multilevel converters (HB-MMC), quadrupled neutral point clamped (Q-NPC) converters, quadrupled hybrid neutral point clamped (Q-HNPC) converters, etc.

It will be appreciated that the proposed sensor-less single-carrier PWM method may be independent of any time drift since it can use only one carrier signal for generating the switching signals, which is a significant advantage over the conventional PS-PWM method strongly depends on the time drift (or time shift) between its two carrier signals when the conventional two-carrier phase-shifted PWM method is implemented.

Figure 10A:
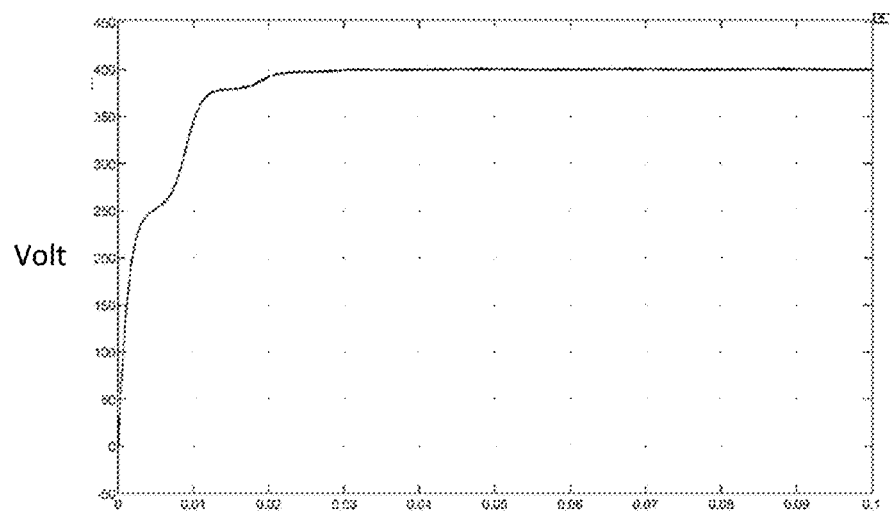
FIG. 10A shows a simulation of the voltage across the flying capacitor of the 3L-FCM at startup when using the proposed constant-frequency single-carrier sensor-less modulation method.
Figure 11A:
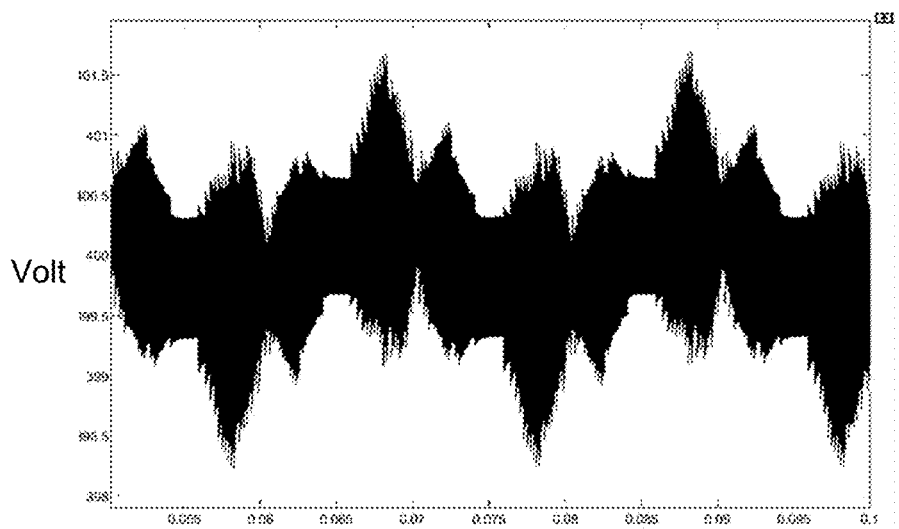
FIG. 11A shows a zoom of the voltage of said FC after startup (in steady state) to better see the FC ripples of simulation of FIG. 10A.
Figure 12A:
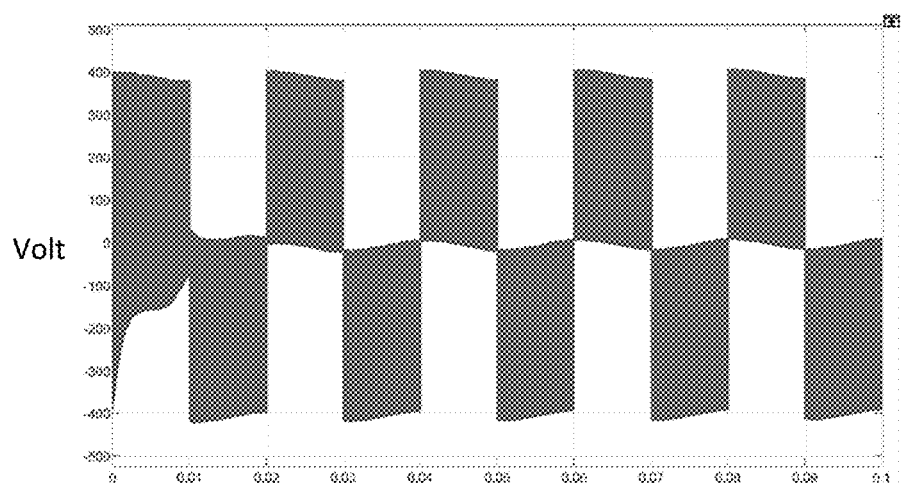
FIG. 12A shows a simulation of the output voltage of the 3L-FCM when using the proposed constant-frequency single-carrier sensor-less modulation method using a low-cost ATMEGA8 microcontroller for generating the carrier signal.

FIGS. 10A, 11A and 12A present curves of various signals resulting from simulated tests of a 3L-FCM using an embodiment of the proposed sensor-less single-carrier PWM method.

Figure 10B:
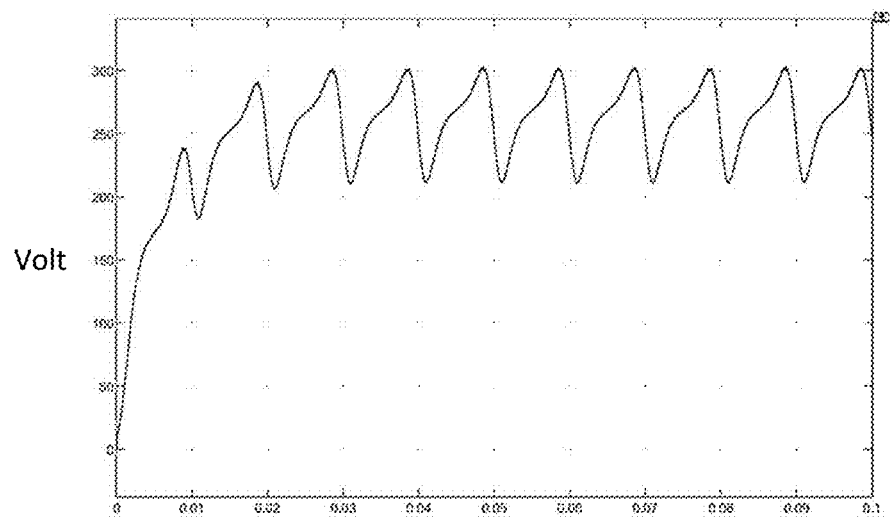
FIG. 10B shows a simulation of the voltage across the flying capacitor of the 3L-FCM at startup when using a conventional modulation method (2-carriers/1-reference) with a low-cost ATMEGA8 microcontroller for generating the two phase shifted carrier signals, when a drift between carrier signals is fixed at 1 µs.
Figure 11B:
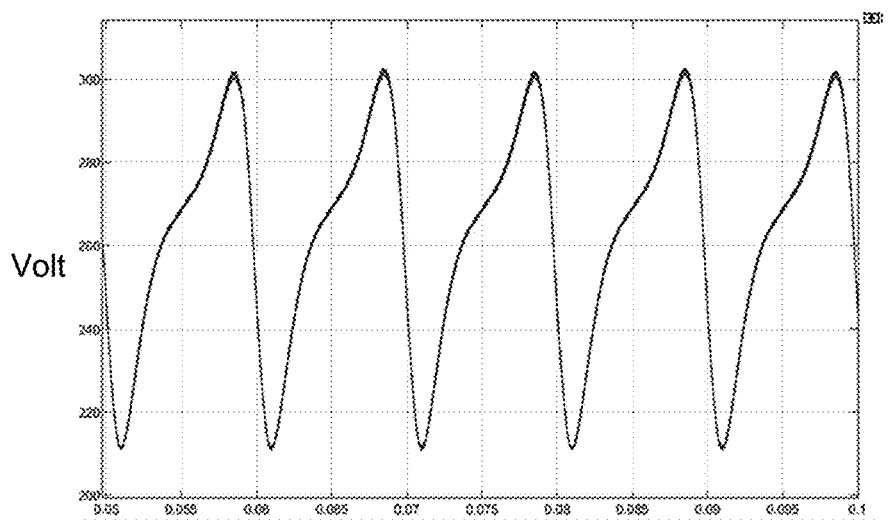
FIG. 11B shows a zoom of the voltage of said FC after startup (in steady state) to better see the FC ripples of simulation of FIG. 10B.
Figure 12B:
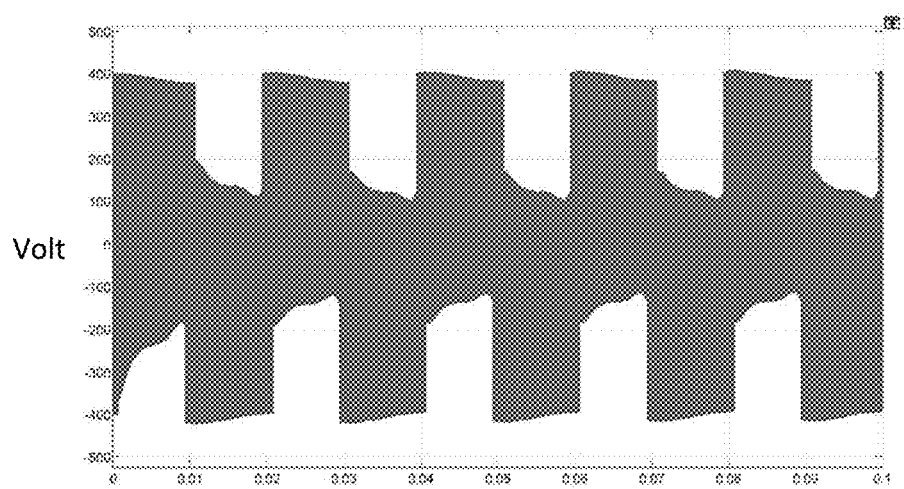
FIG. 12B shows a simulation of the output voltage of the 3L-FCM when using a conventional modulation method with a low-cost ATMEGA8 microcontroller for generating the two phase shifted carrier signals, when a drift between carrier signals is fixed at 1 µs.

FIGS. 10B, 11B and 12B present curves of various signals resulting from simulated tests of a 3L-FCM using a first embodiment of the conventional two-carrier PS-PWM method also driven by an ATMEGA8 microcontroller. A conventional two-carrier PS-PWM method can comprise a switching signal generator that can generate signals for driving the various pair of switches of a same 3L-FCM by comparing a single reference signal with two carrier signals, phase shifted by half a phase (180 degrees) from one another, that can be generated by two carrier signal generator (one for each carrier signal). In these simulations, a time drift of 1 μs between its two carrier signals is considered and fixed, which corresponds to a probable and even common value of drift in such a configuration.

Figure 10C:
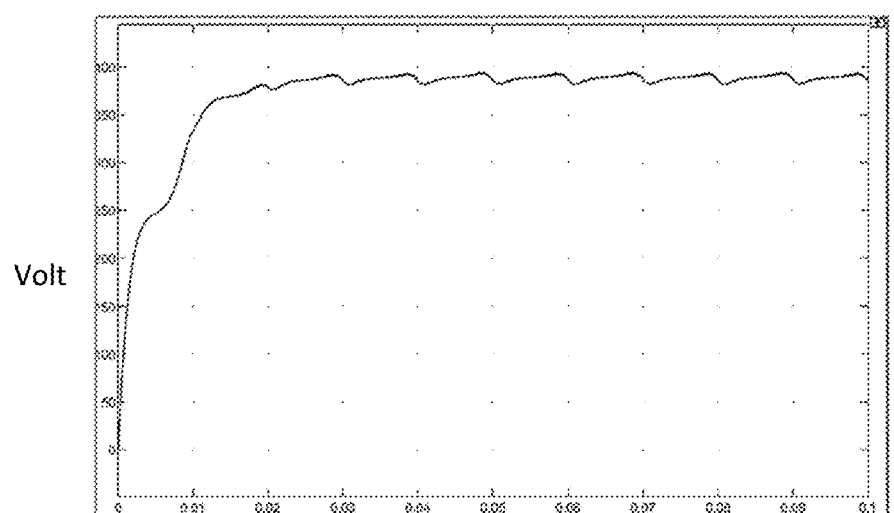
FIG. 10C shows a simulation of the voltage across the flying capacitor of the 3L-FCM on startup when using a conventional modulation method (2-carriers/1-reference) with a powerful STMicroelectronics STM32 F4 Cortex™-M4 MCU for generating the two phase shifted carrier signals, when a drift between carrier signals is fixed at 100 ns.
Figure 11C:
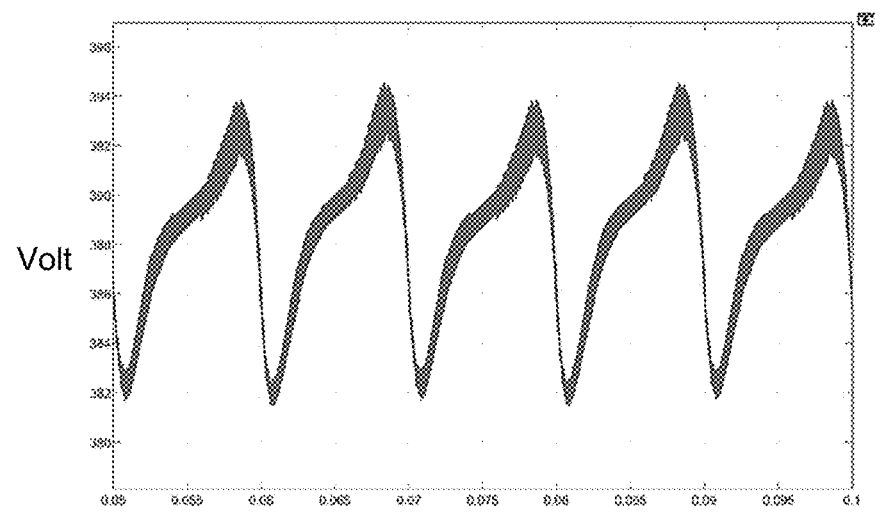
FIG. 11C shows a zoom of the voltage of said FC after startup (in steady state) to better see the FC ripples of simulation of FIG. 10C.
Figure 12C:
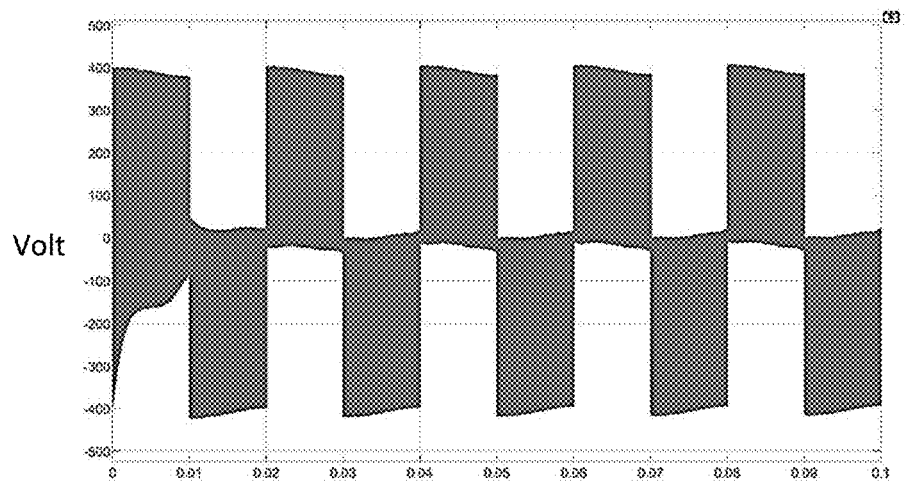
FIG. 12C shows a simulation of the output voltage of the 3L-FCM when using a conventional modulation method with powerful STMicroelectronics STM32 F4 Cortex™-M4 MCU for generating the two phase shifted carrier signals, when a drift between carrier signals is fixed at 100 ns.

FIGS. 10C, 11C and 12C present curves of various signals resulting from simulated tests of a 3L-FCM using a second embodiment of conventional two-carrier PS-PWM method driven by powerful STMicroelectronics STM32 F4 Cortex™-M4 MCUs that can have a maximum clock of 209 MHZ, which can commonly lead to the time drift of about 100 ns used in the associated simulations.

FIGS. 10A, 10B and 10C show the curve of simulated FC voltages after start up for the embodiments described above. FIGS. 11A, 11B and 11C are zooms of the voltage of said FC after start up (when a steady state is reached) to better see the FC ripples of FIGS. 10A, 10B and 10C, respectively.

FIGS. 10A/11A, 10B/11B and 10C/11C show the respective flying capacitor (FC) voltage of the simulations as described above. As it can be observed by comparing these figures, the voltage on FC is significantly better regulated (around about 400V) with little to no ripples (of about 3.5V peak-to-peak) when using the proposed method, whereas it is centered around about 255V corresponding to an error of about 150V, since it should be around 400V, and the peak-to-peak voltage ripple across the FC is of about 90V for the simulation using the first embodiment of the conventional method (with a drift of 1 μs). This may correspond to a reduction of peak-to-peak voltage ripples across the FC of about 35% of the FC voltage (e.g. about 34%=90V/255V−3.5V/400V). For the simulation using the second embodiment of the conventional method (with a drift of 100 ns), the FC voltage is regulated to about 388V, corresponding to an error of about 12V, while the peak-to-peak voltage ripple is of about 12V. This may correspond to a reduction of peak-to-peak voltage ripples across the FC of more than about 10% of the FC voltage (e.g. about 12.1%=12V/388V−3.5V/400V). These significant gaps between the embodiments of the conventional method and the proposed method are considerable and can allow to use smaller FC due to the lower voltage ripple across, while allowing to produce a high-quality output voltage having little to no voltage ripple (e.g. no ripples at zero voltage level).

FIGS. 12A, 12B and 12C show output voltages of the simulated embodiments described above. It becomes clear that the output voltage produced by the proposed method can be of a significantly higher quality, since the output voltage of the first embodiment of the conventional method (with a drift of 1 μs) can compare to the output of an unstable converter and since the output voltage of the second embodiment of the conventional method (with a drift of 100 ns) contains high-voltage ripples around zero voltage level.

What is claimed is:

1. A three-level flying capacitor multi-level power converter controlled by a switching signal generator, having a reference signal input, for generating switching signals for driving a first pair of switches and a second pair of switches comprising:
    a flying capacitor;
    a reference signal generator connected to said reference signal input and for generating a reference signal;
    circuitry for generating, from said reference signal, a first modified reference signal defined as half of the sum of 1 and said reference signal;
    circuitry for generating from said first modified reference signal a second modified reference signal having a half-period phase shift from said first modified reference signal, said second modified reference signal is equivalent to said first modified reference signal phase shifted by 180 degrees, said 180 degrees phase shift resulting from subtracting said first reference signal from a maximum amplitude of said first reference signal;
    a carrier signal generator for generating a carrier signal having a constant frequency; and
    a first comparator and a second comparator for comparing said first and said second modified reference signals to said carrier signal to generate frequency signals for driving said first pair of switches, and second pair of switches, respectively;
    wherein said comparing allows for differential gating of said first pair of switches and said second pair of switches to cause charging or discharging of said flying capacitor and allows for common gating of said first pair of switches and said second pair of switches to bypass said flying capacitor.

2. The three-level flying capacitor multi-level power converter of claim 1, further comprising:
    a DC terminal; and
    an AC terminal;
        wherein said carrier signal generator is operable to generate said carrier signal having said constant frequency higher than 50 kHz, said first pair of switches S1, S1' is connected at one end to said AC terminal and is connected at a second end to opposed terminals of said flying capacitor; and
        wherein said carrier signal generator is operable to generate said carrier signal having said constant frequency higher than 50 kHz, said second pair of switches S2, S2' is connected at one end to said opposed terminals of said flying capacitor and is connected at a second end directly to said DC terminal.

3. The three-level flying capacitor multi-level power converter of claim 2, wherein a voltage ripple on said flying capacitor has a peak-to-peak voltage ripple reduced by more than about 10% and up to about 35% of a voltage of said flying capacitor with respect to a peak-to-peak voltage ripple on a flying capacitor of a similar three-level flying capacitor multi-level power converter having:
    same said first and said second pair of switches;
    a single said modified reference signal;
    two of said carrier signal generators to produce a first carrier signal and a second carrier signal having a time drift of more than about 100 ns and up to about 1 μs from said first carrier signal; and
    said first comparator and second comparator comparing said single modified reference signal to said first carrier signal and said second carrier signal, respectively.

4. The three-level flying capacitor multi-level power converter of claim 1, wherein said first pair of switches and said second pair of switches are wide-bandgap fast power switches operating at a frequency of over about 50 kHz.

5. The three-level flying capacitor multi-level power converter of claim 1, further comprising a DC terminal; wherein said carrier signal generator is operable to generate said carrier signal having said constant frequency higher than 50 kHz, said second pair of switches is connected at one end to opposed terminals of said flying capacitor and is connected at a second end directly to said DC terminal; and wherein said second end of said second pair of switches connected directly to said DC terminal is further connected to a first end of a pair of two high-voltage capacitors, and wherein said pair of high-voltage capacitors are connected at a second end to neutral.

6. The three-level flying capacitor multi-level power converter of claim 1, further comprises at least one additional converter having at least one pair of switches, wherein said switching signal generator generates switching signals for driving said first pair of switches and said second pair of switches of said three-level flying capacitor multi-level power converter and for driving said at least one pair of switches of said additional converter.

7. The three-level flying capacitor multi-level power converter of claim 1, wherein said switching signal generator controls said three-level flying capacitor multi-level power converter for converting an AC input to a direct current output.

8. The three-level flying capacitor multi-level power converter of claim 1, wherein said switching signal generator controls said three-level flying capacitor multi-level power converter for converting a direct current input to an AC output.

9. A three-phase variable frequency motor drive comprising;
    three of said three-level flying capacitor multi-level power converter as defined in claim 8;
    wherein a negative DC current of each one of said direct current inputs are connected in parallel and wherein a positive DC current of each one of said direct current input are connected in parallel;
    wherein said three of said three-level flying capacitor multi-level power converter share a pair of high-voltage capacitors and share a common said direct current input; and
    wherein each of said alternative current output of each of said three of said three-level flying capacitor multi-level power converter are phase-shifted by 120 degrees from said alternative current output of each other ones of said three-level flying capacitor multi-level power converter.

10. The three-phase variable frequency motor drive of claim 9, wherein the switches of said three-phase variable frequency motor drive are driven by the same said switching signal generator.

11. A bidirectional back-to-back converter comprising;
two of said three-level flying capacitor multi-level power converters as defined in claim 1;
wherein said switching signal generator of a first one of said two of said three-level flying capacitor multi-level power converters controls said first one of said two of three-level flying capacitor multi-level power converter for converting an alternative current input to a direct current output;
wherein said switching signal generator of a second one of said two three-level flying capacitor multi-level power converters controls said three-level flying capacitor multi-level power converter for converting a direct current input to an alternative current output;
wherein said alternative current input is an AC power input of said bidirectional back-to-back converter;
wherein said alternative current output is an AC power output of said bidirectional back-to-back converter;
wherein a negative DC current of said direct current output is connected to a negative DC current of direct current input, wherein a positive DC current of said direct current output is connected to a positive DC current of said direct current input, and wherein a neutral of each of said three-level flying capacitor multi-level power converters is connected together; and
wherein each of said three-level flying capacitor multi-level power converters share a pair of high-voltage capacitors.

12. A three-phase variable frequency motor drive comprising:
three of said bidirectional back-to-back converters as defined in claim 11;
wherein each one of said negative DC current of said three of said bidirectional back-to-back converters are connected in parallel and wherein each one of said positive DC current of said three of said bidirectional back-to-back converters are connected in parallel;
wherein said three of said bidirectional back-to-back converters share said pair of high-voltage capacitors, and
wherein said power AC power output of each one of said three of said bidirectional back-to-back converters are phase-shifted by 120 degrees from said AC power output of each other ones of said three of said bidirectional back-to-back converters.

13. The three-phase variable frequency motor drive of claim 12, wherein the switches of said three-phase variable frequency motor drive are driven by the same said switching signal generator.

14. A method of power conversion using a three-level flying capacitor multi-level power converter, comprising:
providing said three-level flying capacitor multi-level power converter having an input current, an output current, an AC terminal and a flying capacitor;
generating a carrier signal having a constant frequency;
generating a first modified reference signal defined as half of the sum of 1 and a reference signal;
generating a second modified reference signal having a half-period phase shift from said first modified reference signal, said second modified reference signal is equivalent to said first modified reference signal phase shifted by 180 degrees, said 180 degrees phase shift resulting from subtracting said first reference signal from a maximum amplitude of said first reference signal; and
generating switching signals by comparing said first and said second modified reference signals to said carrier signal for driving a first pair of power switches and a second pair of power switches of said three-level flying capacitor multi-level power converter for converting said input current to said output current and reducing an energy loss of said converting, wherein said comparing allows for differential gating of said first pair of power switches and said second pair of power switches to cause charging or discharging of said flying capacitor and allows for common gating of said first pair of power switches and said second pair of power switches to bypass said flying capacitor.

15. The method of claim 14, wherein said reducing comprises a reduction of a first switching harmonic cluster or a reduction of odd multiples of switching harmonic clusters or a combination thereof.

16. The method of claim 14, wherein said generating said switching signals comprises:
generating a first switching signal by comparing said first modified reference to said carrier signal for driving said first pair of power switches at a frequency higher than 50 kHz, wherein said first pair of power switches is connected at one end to said AC terminal and at a second end to opposed terminals of said flying capacitor; and
generating a second switching signal by comparing said second modified reference to said carrier signal for driving said second pair of power switches at a frequency higher than 50 kHz, wherein said second pair of power switches is connected at one end to said AC terminal and at a second end to opposed terminals of said flying capacitor.

17. The method of claim 14, wherein said energy loss of said converting results from a reduction of emanated electromagnetic interferences.

18. The method of claim 14, wherein said energy loss of said converting results from a reduction of ripples on said flying capacitor.

19. The method of claim 14, wherein said energy loss of said converting results from a suppression of a first and odd multiples of a switching harmonic clusters of said three-level flying capacitor multi-level power converter, wherein said suppression generates an improved harmonic spectrum of said output voltage.

* * * * *